(12) United States Patent
Endo

(10) Patent No.: US 11,100,699 B2
(45) Date of Patent: Aug. 24, 2021

(54) MEASUREMENT METHOD, MEASUREMENT DEVICE, AND RECORDING MEDIUM

(71) Applicant: OLYMPUS CORPORATION, Tokyo (JP)

(72) Inventor: Naofumi Endo, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 16/789,710

(22) Filed: Feb. 13, 2020

(65) Prior Publication Data
US 2020/0265635 A1    Aug. 20, 2020

(30) Foreign Application Priority Data

Feb. 15, 2019  (JP) .............................. JP2019-025650

(51) Int. Cl.
| | |
|---|---|
| *G06T 15/20* | (2011.01) |
| *G06K 9/00* | (2006.01) |
| *G06K 9/46* | (2006.01) |
| *G01B 11/02* | (2006.01) |

(52) U.S. Cl.
CPC .......... *G06T 15/205* (2013.01); *G01B 11/022* (2013.01); *G06K 9/00671* (2013.01); *G06K 9/4604* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 2010/0111370 | A1* | 5/2010 | Black | G06K 9/00369 382/111 |
| 2015/0154453 | A1* | 6/2015 | Wilf | G06K 9/46 382/103 |
| 2016/0005229 | A1* | 1/2016 | Lee | G06F 3/0488 345/419 |
| 2017/0372466 | A1* | 12/2017 | Hirota | H04W 84/06 |

FOREIGN PATENT DOCUMENTS

| | | |
|---|---|---|
| JP | 3347385 B2 | 11/2002 |
| JP | 2005-189055 A | 7/2005 |

* cited by examiner

*Primary Examiner* — Tize Ma
(74) *Attorney, Agent, or Firm* — Scully, Scott, Murphy & Presser, P.C.

(57) ABSTRACT

In a measurement method, a processor selects one first image included in a plurality of two-dimensional images of a subject. The processor sets one of the selected first image and one second image extracted from the plurality of two-dimensional images on the basis of the selected first image as a measurement image. The processor extracts at least one third image from the plurality of two-dimensional images. The processor generates a three-dimensional shape of the subject on the basis of a position and a posture of a camera when each image is generated. The processor determines whether or not an image is suitable for measurement with respect to at least one of the first image, the measurement image, and the third image.

17 Claims, 24 Drawing Sheets

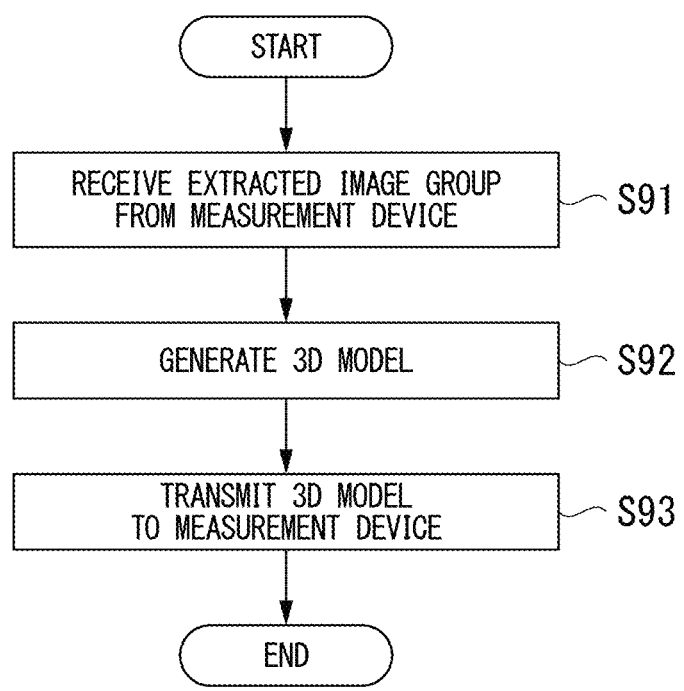

MEASUREMENT METHOD, MEASUREMENT DEVICE, AND RECORDING MEDIUM

BACKGROUND OF THE INVENTION

Field of the Invention

The present invention relates to a measurement method, a measurement device, and a recording medium.

Priority is claimed on Japanese Patent Application No. 2019-025650, filed on Feb. 15, 2019, the contents of which is incorporated herein by reference.

Description of Related Art

A technology to reconfigure a three-dimensional shape of a subject by using a plurality of images acquired from a plurality of viewpoints different from each other has been developed. This technology is called structure from motion (SfM) in the specification. By using this technology, it is possible to reconfigure a three-dimensional shape of a subject on the basis of video or a plurality of still images and measure the size of the subject.

In a case in which reconfiguration of a three-dimensional shape (3D reconfiguration) is executed by using this technology, a three-dimensional shape not having the absolute size but having the relative scale is reconfigured in principle. For this reason, it is possible to execute measurement in the absolute size (dimension of length) by setting a known size to the acquired three-dimensional shape. For example, Japanese Patent No. 3347385 and Japanese Unexamined Patent Application, First Publication No. 2005-189055 disclose a method of executing 3D reconfiguration and measurement by combining SfM and input of the absolute size.

Japanese Patent No. 3347385 discloses a method of executing 3D reconfiguration and measurement in the absolute size by combining SfM and known motion of a camera. Japanese Unexamined Patent Application, First Publication No. 2005-189055 discloses a method of executing 3D reconfiguration and measurement in the absolute size on the basis of the known size of a subject designated by a user on an image.

SUMMARY OF THE INVENTION

According to a first aspect of the present invention, a measurement method includes a selection step, an image setting step, an extraction step, a generation step, a determination step, a first image display step, a point setting step, and a measurement step. A processor selects one first image included in a plurality of two-dimensional images of a subject in the selection step when a first instruction for selecting the first image is accepted through an input device. The processor sets one of one second image and the first image as a measurement image in the image setting step. The second image is extracted from the plurality of two-dimensional images on the basis of the first image. The processor extracts at least one third image different from the measurement image from the plurality of two-dimensional images in the extraction step after the image setting step is executed. A viewpoint of a camera when each image of an image group is generated and a viewpoint of the camera when another image of the image group is generated are different from each other. The image group consists of the measurement image and the third image. The processor generates a three-dimensional shape of the subject, after the extraction step is executed, on the basis of a position and a posture of the camera in the generation step. The position and the posture are a position and a posture, respectively, when each image of the image group is generated. The processor determines whether or not an object image is suitable for measurement in the determination step. The object image is at least one of the first image, the measurement image, and the third image. The processor displays the measurement image on a display in the first image display step. The processor sets at least two measurement points on the measurement image in the point setting step after the measurement image is displayed. The processor measures a size of the subject on the basis of the at least two measurement points and the three-dimensional shape in the measurement step only when the processor determines that the object image is suitable for measurement in the determination step. The determination step is executed at least once between an execution timing of the selection step and an execution timing of the measurement step.

According to a second aspect of the present invention, in the first aspect, the determination step may be executed at least once between an execution timing of the extraction step and the execution timing of the measurement step.

According to a third aspect of the present invention, in the second aspect, the measurement method may further include a second display step in which, before the measurement step is executed, the processor displays a three-dimensional image representing the three-dimensional shape on the display in a case in which the processor determines that the object image is suitable for measurement in the determination step.

According to a fourth aspect of the present invention, in the third aspect, the measurement method may further include a cursor display step in which the processor displays a first cursor on the measurement image and displays a second cursor at a position on the three-dimensional image corresponding to a position of the first cursor on the measurement image before the measurement step is executed.

According to a fifth aspect of the present invention, in the third or fourth aspect, the measurement method may further include a reliability calculation step and a reliability display step. The processor calculates reliability of each position on the three-dimensional shape on the basis of the image group in the reliability calculation step before the measurement step is executed. The reliability represents accuracy of the size measured in a case in which it is assumed that the measurement step is executed. The processor displays the reliability on the three-dimensional image in the reliability display step before the measurement step is executed.

According to a sixth aspect of the present invention, in any one of the third to fifth aspects, the measurement method may further include a region display step in which the processor displays a region onto the measurement image before the measurement step is executed. The region includes a position on the measurement image that does not correspond to any position on the three-dimensional shape.

According to a seventh aspect of the present invention, in the second aspect, the measurement method may further include an output step in which the processor outputs information that represents a reason why the object image is determined to be not suitable for measurement on the basis of a result of the determination step when the processor determines that the object image is not suitable for measurement in the determination step.

According to an eighth aspect of the present invention, in the second aspect, the measurement method may further include an output step in which the processor outputs information that represents that the object image is not suitable for measurement when the processor determines that the object image is not suitable for measurement in the determination step. After the information is output, the selection step or the image setting step may be executed again.

According to a ninth aspect of the present invention, in any one of the second to seventh aspects, the measurement method may further include an information input step in which the processor accepts change method information through the input device after the determination step is executed. The change method information represents that the measurement image is changed either manually or automatically. The image setting step may be executed again when the change method information represents that the measurement image is changed automatically. The selection step may be executed again when the change method information represents that the measurement image is changed manually.

According to a tenth aspect of the present invention, in the ninth aspect, each image included in the plurality of two-dimensional images may be associated with a time point at which the image is generated. In the image setting step executed again, the processor may extract one image from the plurality of two-dimensional images. The extracted images are different from the measurement image and generated in a predetermined period that is based on a time point at which the measurement image is generated. In the image setting step executed again, the processor may set the extracted image as a new measurement image.

According to an eleventh aspect of the present invention, in the ninth aspect, in the image setting step executed again, the processor may calculate an amount of movement between the measurement image and each image included in the plurality of two-dimensional images and extract one image from the plurality of two-dimensional images. The amount of the extracted image is less than a predetermined threshold value and the extracted image is different from the measurement image. In the image setting step executed again, the processor may set the extracted image as a new measurement image.

According to a twelfth aspect of the present invention, in any one of the second to seventh aspects, after the determination step is executed, the image setting step may be executed again when a second instruction for changing the measurement image is accepted through the input device. Each image included in the plurality of two-dimensional images may be associated with a time point at which the image is generated. In the image setting step executed again, the processor may extract one image from the plurality of two-dimensional images. The extracted images are different from the measurement image and generated in a predetermined period that is based on a time point at which the measurement image is generated. In the image setting step executed again, the processor may set the extracted image as a new measurement image.

According to a thirteenth aspect of the present invention, in any one of the second to seventh aspects, after the determination step is executed, the image setting step may be executed again when a second instruction for changing the measurement image is accepted through the input device. In the image setting step executed again, the processor may calculate an amount of movement between the measurement image and each image included in the plurality of two-dimensional images and extract one image from the plurality of two-dimensional images. The amount of the extracted image is less than a predetermined threshold value and the extracted image is different from the measurement image. In the image setting step executed again, the processor may set the extracted image as a new measurement image.

According to a fourteenth aspect of the present invention, in any one of the second to sixth aspects, the measurement method may further include a position input step in which, before the measurement step is executed, the processor accepts position information that represents a position on the measurement image through the input device when the processor determines that the object image is suitable for measurement in the determination step. After the position input step is executed, the extraction step may be executed again. The processor may extract the at least one third image including the position represented by the position information from the plurality of two-dimensional images in the extraction step.

According to a fifteenth aspect of the present invention, in any one of the second to fourteenth aspects, the processor may trace feature points of each image included in the plurality of two-dimensional images between the images in the extraction step. The determination step may be executed between an execution timing of the extraction step and an execution timing of the generation step. The processor may execute the determination step on the basis of a result that the processor traces the feature points.

According to a sixteenth aspect of the present invention, in any one of the second to fourteenth aspects, the determination step may be executed between an execution timing of the generation step and an execution timing of the measurement step. The processor may execute the determination step on the basis of a result that the processor generates the three-dimensional shape.

According to a seventeenth aspect of the present invention, a measurement device includes a processor. The processor is configured to select one first image included in a plurality of two-dimensional images of a subject when a first instruction for selecting the first image is accepted through an input device. The processor is configured to set one of one second image and the first image as a measurement image. The second image is extracted from the plurality of two-dimensional images on the basis of the first image. The processor is configured to extract at least one third image different from the measurement image from the plurality of two-dimensional images after the image setting step is executed. A viewpoint of a camera when each image of an image group is generated and a viewpoint of the camera when another image of the image group is generated are different from each other. The image group consists of the measurement image and the third image. The processor is configured to generate a three-dimensional shape of the subject, after the extraction step is executed, on the basis of a position and a posture of the camera. The position and the posture are a position and a posture, respectively, when each image of the image group is generated. The processor is configured to determine whether or not an object image is suitable for measurement. The object image is at least one of the first image, the measurement image, and the third image. The processor is configured to display the measurement image on a display. The processor is configured to set at least two measurement points on the measurement image after the measurement image is displayed. The processor is configured to measure a size of the subject on the basis of the at least two measurement points and the three-dimensional shape only when the processor determines that the object image is suitable for measurement. The processor is configured to determine whether or not the object image is suitable for measurement at least once between a timing at which the first image is selected and a timing at which the size is measured.

According to an eighteenth aspect of the present invention, a non-transitory computer-readable recording medium saves a program for causing a computer to execute a selection step, an image setting step, an extraction step, a generation step, a determination step, a first image display step, a point setting step, and a measurement step. The computer selects one first image included in a plurality of two-dimensional images of a subject in the selection step when a first instruction for selecting the first image is accepted through an input device. The computer sets one of one second image and the first image as a measurement image in the image setting step. The second image is extracted from the plurality of two-dimensional images on the basis of the first image. The computer extracts at least one third image different from the measurement image from the plurality of two-dimensional images in the extraction step after the image setting step is executed. A viewpoint of a camera when each image of an image group is generated and a viewpoint of the camera when another image of the image group is generated are different from each other. The image group consists of the measurement image and the third image. The computer generates a three-dimensional shape of the subject, after the extraction step is executed, on the basis of a position and a posture of the camera in the generation step. The position and the posture are a position and a posture, respectively, when each image of the image group is generated. The computer determines whether or not an object image is suitable for measurement in the determination step. The object image is at least one of the first image, the measurement image, and the third image. The computer displays the measurement image on a display in the first image display step. The computer sets at least two measurement points on the measurement image in the point setting step after the measurement image is displayed. The computer measures a size of the subject on the basis of the at least two measurement points and the three-dimensional shape in the measurement step only when the computer determines that the object image is suitable for measurement in the determination step. The determination step is executed at least once between an execution timing of the selection step and an execution timing of the measurement step.

BRIEF DESCRIPTION OF THE DRAWINGS

FIG. 26 is a flow chart showing a procedure of processing executed by the 3D model generation device according to the fourth embodiment of the present invention.

DETAILED DESCRIPTION OF THE INVENTION

Hereinafter, embodiments of the present invention will be described with reference to the drawings. A measurement device according to each embodiment of the present invention is a device such as a personal computer (PC). The type of a PC is not limited and may be any of a desktop, a laptop, and a tablet. The measurement device may be built-in equipment mounted on a specific device or a system. The measurement device may be environment on a cloud. A subject is an industrial product.

First Embodiment

Figure 1:
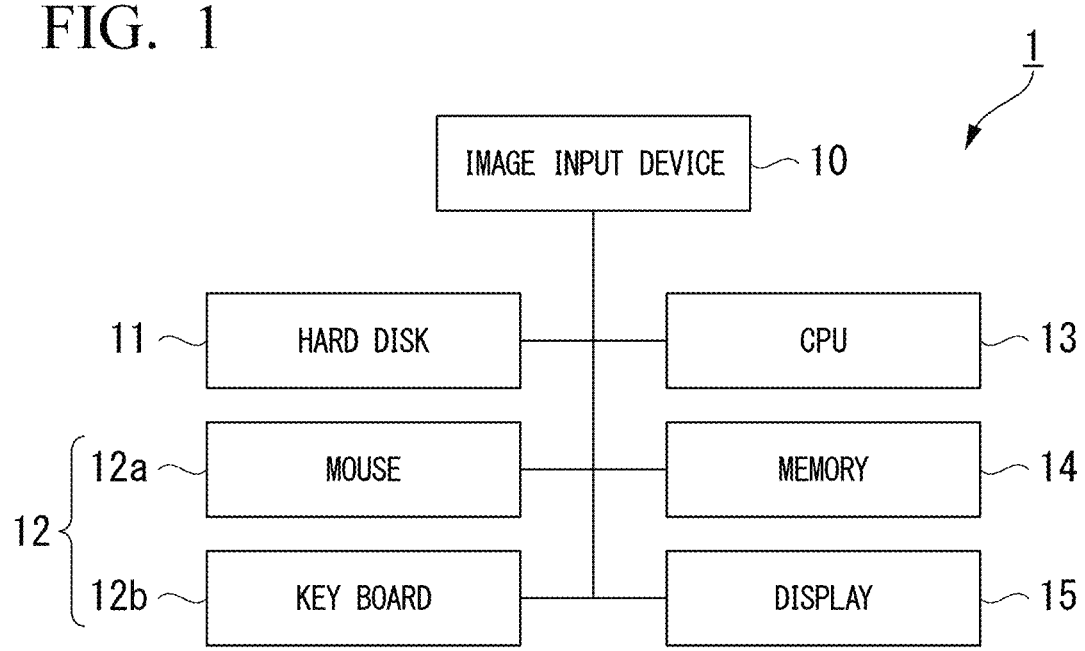
FIG. 1 is a block diagram showing a hardware configuration of a measurement device according to a first embodiment of the present invention.

A first embodiment of the present invention will be described. FIG. 1 shows a hardware configuration of a measurement device 1 according to the first embodiment. The measurement device 1 shown in FIG. 1 includes an image input device 10, a hard disk 11, an operation unit 12, a central processing unit (CPU) 13, a memory 14, and a display 15.

The image input device 10 accepts an image from an external device. For example, the image input device 10 is connected to the external device through a cable or by radio. For example, the external device is a storage device such as a hard disk or a memory. An image stored on the storage device is input to the image input device 10. The external device may be equipment on a network such as a local area network (LAN) or the Internet. The image input device 10 may communicate with the equipment and receive an image from the equipment.

The hard disk 11 stores the image accepted by the image input device 10. The measurement device 1 may include a solid state drive (SSD) instead of the hard disk.

The operation unit 12 is a user interface (input interface). The operation unit 12 includes a mouse 12a and a key board 12b. A user inputs information of a measurement point, a reference point, and the like by operating the mouse 12a and the key board 12b. The operation unit 12 may include at least one of a button, a switch, a key, a joystick, a touch pad, a track ball, and a touch panel.

The CPU 13 executes processing for generation (reconfiguration) of a three-dimensional shape of a subject and measurement. The functions of the CPU 13 will be described later with reference to FIG. 2.

The memory 14 is a volatile or nonvolatile memory. For example, the memory 14 is at least one of a random access memory (RAM), a dynamic random access memory (DRAM), a static random access memory (SRAM), a read-only memory (ROM), an erasable programmable read-only memory (EPROM), an electrically erasable programmable read-only memory (EEPROM), and a flash memory. The memory 14 stores the image accepted by the image input device 10 or an image processed by the CPU 13.

The display 15 is a monitor such as a liquid crystal display. The display 15 may be a touch panel display. In such a case, the operation unit 12 and the display 15 are integrated.

Figure 2:
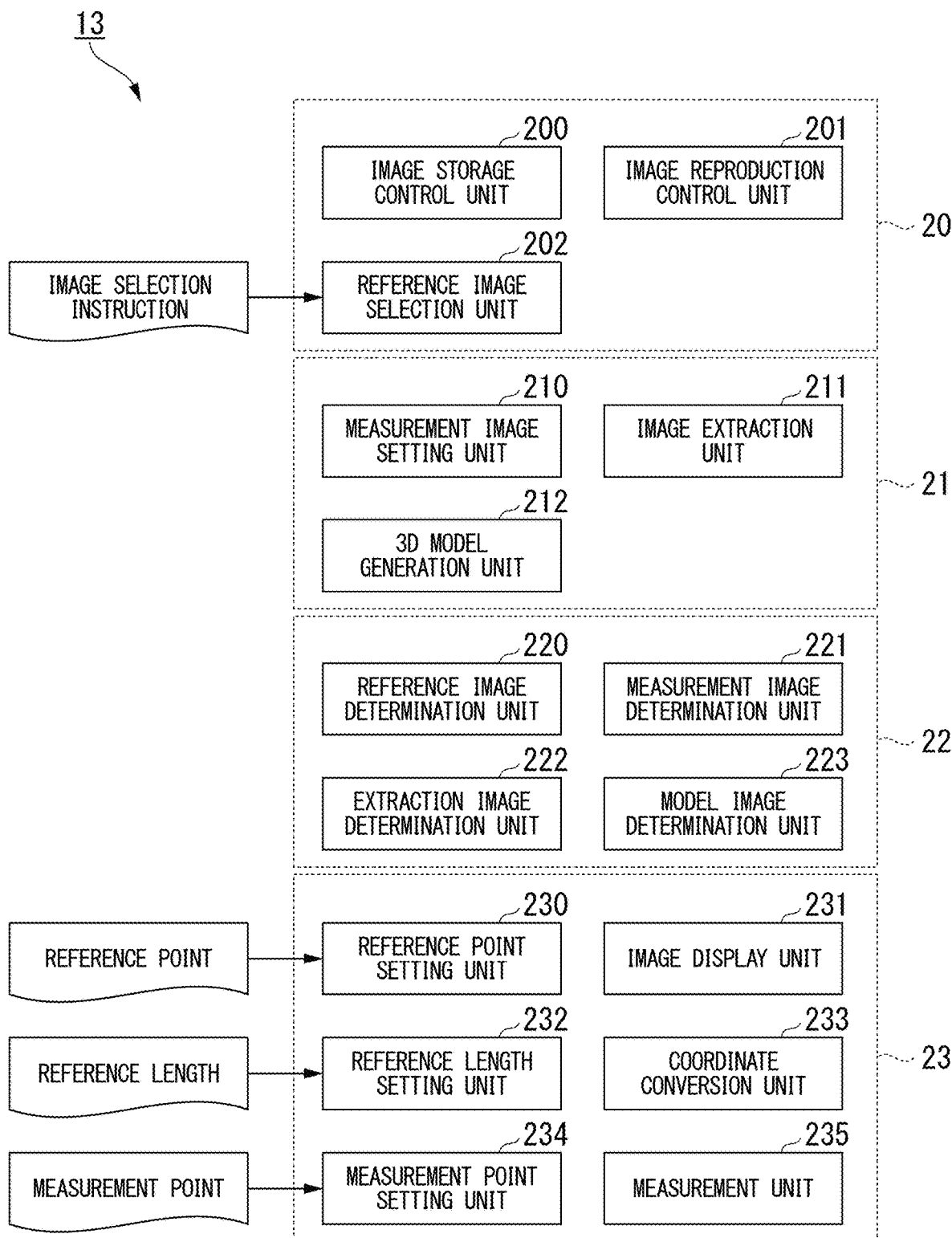
FIG. 2 is a block diagram showing a functional configuration of a CPU included in the measurement device according to the first embodiment of the present invention.

FIG. 2 shows a functional configuration of the CPU 13. An image reproduction unit 20, a 3D model acquisition unit 21, an image determination unit 22, and a measurement processing unit 23 constitute the functions of the CPU 13.

The image reproduction unit 20 includes an image storage control unit 200, an image reproduction control unit 201, and a reference image selection unit 202.

The image storage control unit 200 stores a time-series image accepted by the image input device 10 on the hard disk 11 or the memory 14. The time-series image includes at least two images generated by a camera. Each image included in the time-series image is a two-dimensional image of a subject. Each image included in the time-series image is associated with another image included in the time-series image in chronological order. For example, the time-series image is video. The time-series image may be a continuous still image group to which timestamps are added. The file extension of video or a still image is not limited.

The image reproduction control unit 201 reproduces the time-series image and displays the time-series image on the display 15. The image reproduction control unit 201 includes a basic image reproduction function such as fast-forwarding, pausing, and rewinding.

The reference image selection unit 202 selects a reference image that is the reference for extracting an image used for generating a 3D model that represents a three-dimensional shape of a subject. When an image on which a user desires to designate a measurement point or a reference point is displayed, the user inputs an image selection instruction by operating the operation unit 12. The reference image selection unit 202 accepts the image selection instruction from the operation unit 12. When the image selection instruction is accepted, the reference image selection unit 202 selects the image displayed on the display 15 as the reference image.

The 3D model acquisition unit 21 includes a measurement image setting unit 210, an image extraction unit 211, and a 3D model generation unit 212.

The measurement image setting unit 210 sets the reference image selected by the reference image selection unit 202 as a measurement image. Alternatively the measurement image setting unit 210 sets one image extracted from the time-series image on the basis of the reference image as a measurement image. For example, the viewpoint of a camera when the reference image is generated and the viewpoint of the camera when a measurement image is generated are different from each other. In a case in which the distance between the two viewpoints are small, a measurement image different from the reference image may be set. In other words, the difference between the visual field of the reference image and the visual field of the measurement image is small. The amount of movement of each pixel between the reference image and the measurement image may be small. The difference between the time point at which the reference image is generated and the time point at which the measurement image is generated may be small.

The image extraction unit 211 extracts at least one image from the time-series image on the basis of the measurement image set by the measurement image setting unit 210. At least one image extracted by the image extraction unit 211 and the measurement image constitute an image group.

The 3D model generation unit 212 estimates the position and the posture of a camera. The estimated position and posture are a position and a posture of the camera, respectively, when each image of the image group is generated. The 3D model generation unit 212 generates a 3D model of a subject on the basis of the estimated position and posture. The 3D model (three-dimensional coordinate group) includes data of three-dimensional coordinates of a subject. The 3D model may include data of three-dimensional coordinates of only at least two points designated by a user. For example, after a reference point and a measurement point described later are set, the 3D model generation unit 212 may generate a 3D model including data of three-dimensional coordinates of only each of the points on the basis of an image on which each of the points has been set.

The image determination unit 22 includes a reference image determination unit 220, a measurement image determination unit 221, an extraction image determination unit 222, and a model image determination unit 223.

The reference image determination unit 220 determines whether or not the reference image selected by the reference image selection unit 202 is suitable for measurement. For example, the reference image determination unit 220 can determine whether or not the reference image is suitable for measurement on the basis of the brightness of the reference image, the texture of the reference image, the state of blur of the reference image, or the like.

The measurement image determination unit 221 determines whether or not the measurement image set by the measurement image setting unit 210 is suitable for measurement. For example, the processing executed by the measurement image determination unit 221 is similar to the processing executed by the reference image determination unit 220.

The extraction image determination unit 222 determines whether or not at least one image extracted by the image extraction unit 211 is suitable for measurement. For example, the extraction image determination unit 222 determines whether or not the image is suitable for measurement on the basis of the result obtained in the processing executed by the image extraction unit 211.

The model image determination unit 223 determines whether or not the image group that has been used for generating a 3D model is suitable for measurement. For example, the model image determination unit 223 determines whether or not the image group is suitable for measurement on the basis of the result obtained in the processing executed by the 3D model generation unit 212.

Details of processing executed by each of the reference image determination unit 220, the measurement image determination unit 221, the extraction image determination unit 222, and the model image determination unit 223 will be described later. Hereinafter, the image determination unit 22 is used for description in a case in which there is no need to distinguish between the reference image determination unit 220, the measurement image determination unit 221, the extraction image determination unit 222, and the model image determination unit 223.

The image determination unit 22 determines the suitability of an image for measurement in order to reduce the possibility that an image not suitable for measurement is used and a measurement result with low accuracy is obtained. When an image includes many regions for which a measurement result with low accuracy is obtained, it is possible to consider the image to be not suitable for measurement. When an image includes few regions for which a measurement result with low accuracy is obtained, it is possible to consider the image to be suitable for measurement.

The image determination unit 22 determines whether or not an image satisfies a determination criterion for considering an image to be suitable for measurement. When the image does not satisfy the determination criterion, the image determination unit 22 determines that the image is not suitable for measurement. When the image satisfies the determination criterion, the image determination unit 22 determines that the image is suitable for measurement.

The measurement processing unit 23 includes a reference point setting unit 230, an image display unit 231, a reference length setting unit 232, a coordinate conversion unit 233, a measurement point setting unit 234, and a measurement unit 235.

A user inputs position information (coordinates) of a reference point that represents the position of the reference size by operating the operation unit 12. The reference point setting unit 230 accepts the position information of a reference point from the operation unit 12. When the position information of a reference point is accepted, the reference point setting unit 230 sets the reference point on an image displayed on the display 15. The reference point is set at the position represented by the position information on the image. The position information of the reference point is stored on the hard disk 11 or the memory 14. The reference point is set by associating the reference point with a specific image.

A user inputs a reference length that represents the reference size by operating the operation unit 12. The reference length setting unit 232 accepts the reference length from the operation unit 12. The reference length is used for matching the 3D model with the actual scale of a subject. When the reference length is accepted, the reference length setting unit 232 sets the reference length on an image displayed on the display 15. The reference length is stored on the hard disk 11 or the memory 14. The reference length is set by associating the reference length with a specific image.

Hereinafter, a case in which a reference point and a reference length are set on the basis of an instruction from a user is assumed. A reference point and a reference length may be automatically set. For example, information of a reference point and a reference length designated by a user in advance is stored on the hard disk 11 or the memory 14. The information may represent a reference point and a reference length that were set when measurement was previously executed. A reference point and a reference length are set on the basis of the information.

A user inputs position information (coordinates) of a measurement point that represents the measurement position by operating the operation unit 12. The measurement point setting unit 234 accepts the position information of a measurement point from the operation unit 12. When the position information of a measurement point is accepted, the measurement point setting unit 234 sets the measurement point on an image displayed on the display 15. The measurement point is set at the position represented by the position information on the image. The position information of the measurement point is stored on the hard disk 11 or the memory 14. The measurement point is set by associating the measurement point with a specific image. At least two measurement points are necessary in order to execute measurement.

Designation of a measurement point or a reference point means that a user instructs the measurement device 1 of the measurement point or the reference point. A user designates a measurement point or a reference point by designating a position on an image. The setting of a measurement point means that the measurement point setting unit 234 associates the measurement point with an image. The setting of a reference point means that the reference point setting unit 230 associates the reference point with an image.

Hereinafter, there is a case in which a point that has been set on an image is described as a designation point in order to indicate any one of a measurement point and a reference point. A designation point is expression including a measurement point and a reference point. In order to put emphasis on the understandability of description, there is a case in which a measurement point or a reference point is used instead of a designation point.

Although a term "point" is used for the convenience of description in the specification, a designation point does not need to be one point corresponding to one pixel on the screen. A designation point may include a region having an arbitrary size. A designation point may include a region that can be designated in units of sub-pixels.

The image display unit 231 displays the measurement image set by the measurement image setting unit 210 on the display 15. After measurement is executed, the image display unit 231 displays a measurement result on the measurement image.

The coordinate conversion unit 233 executes coordinate conversion by using the reference point and the reference length. Specifically, the coordinate conversion unit 233 converts the 3D model generated by the 3D model generation unit 212 into a 3D model having the dimension of length. Before the coordinate conversion is executed, the 3D model does not have the dimension of length and the length on the 3D model has not been decided. The 3D model has only similarity relationship with the size of an actual subject.

The measurement unit 235 calculates three-dimensional coordinates corresponding to each measurement point on the basis of at least two measurement points and the 3D model. The measurement unit 235 measures the three-dimensional size of a subject on the basis of three-dimensional coordinates corresponding to each measurement point. A position on the image used for generating the 3D model and a position on the 3D model are associated with each other. After a measurement point is designated on an image, the measurement unit 235 is able to acquire three-dimensional coordinates corresponding to the measurement point. Similarly, after a reference point is designated on an image, the coordinate conversion unit 233 is able to acquire three-dimensional coordinates corresponding to the reference point.

At least one of blocks in the CPU 13 shown in FIG. 2 may be constituted by a circuit other than the CPU 13. Each unit in the CPU 13 may be constituted by at least one of a processor and a logic circuit. For example, the processor is at least one of a CPU, a digital signal processor (DSP), and a graphics processing unit (GPU). For example, the logic circuit is at least one of an application specific integrated circuit (ASIC) and a field-programmable gate array (FPGA). Each unit in the CPU 13 may include one or a plurality of processors. Each unit in the CPU 13 may include one or a plurality of logic circuits.

The CPU 13 may read a program and execute the read program. The program includes commands defining the operations of the CPU 13. In other words, the functions of the CPU 13 may be realized by software. The program, for example, may be provided by using a "computer-readable storage medium" such as a flash memory. The program may be transmitted from the computer storing the program to the measurement device 1 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). A combination of a program that has already been recorded in a computer and a differential program may realize the functions described above.

The procedure of specific processing executed by the 3D model generation unit 212 for generating a 3D model will be described. The 3D model generation unit 212 uses at least one image extracted by the image extraction unit 211, the measurement image set by the measurement image setting unit 210, and a condition for generating a 3D model.

Specifically, the condition for generating a 3D model includes an internal parameter of a camera, a distortion correction parameter of the camera, a setting value, and the like. The setting value is used for a variety of pieces of processing for generating a 3D model. A user does not need to designate all of these conditions. The CPU 13 may automatically set at least one of these conditions.

Hereinafter, an example in which the 3D model generation unit 212 uses two images will be described. When a camera captures two images, two viewpoints of the camera are different from each other. Even when three or more images are used, a basic principle is not changed from that of the case in which two images are used. A method described below may be applied also to a case in which three or more images are used.

Figure 3:
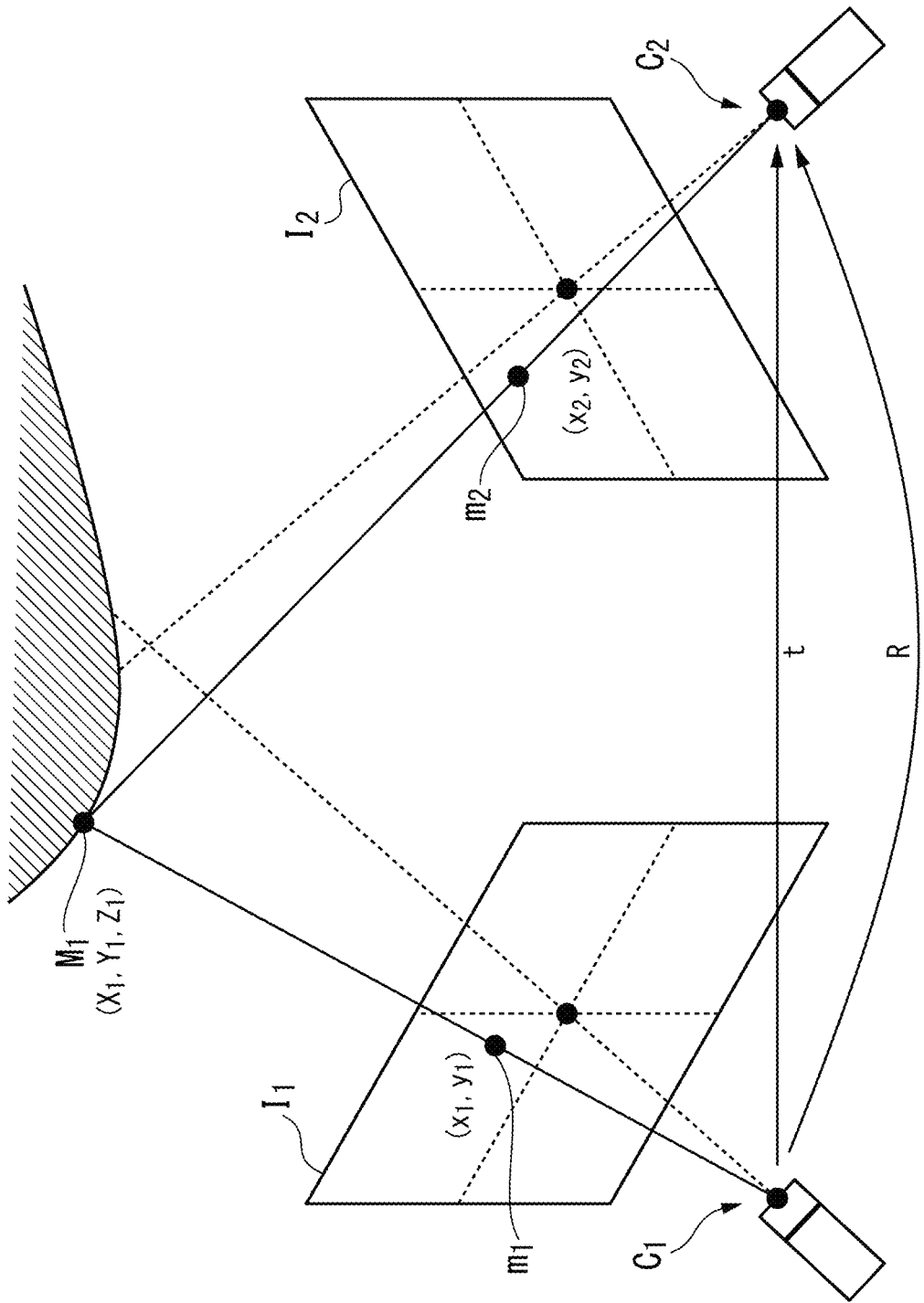
FIG. 3 is a schematic diagram showing a situation of image acquisition in the first embodiment of the present invention.

FIG. 3 schematically shows a status of image acquisition in a case in which two images of a subject are acquired. As shown in FIG. 3, first, an image $I_1$ is acquired in an imaging state $c_1$ of the camera. Next, an image $I_2$ is acquired in an imaging state $c_2$ of the camera. At least one of an imaging position and an imaging posture is different between the imaging state $c_1$ and the imaging state $c_2$. In the case shown in FIG. 3, both the imaging position and the imaging posture are different between the imaging state $c_1$ and the imaging state $c_2$.

In each embodiment of the present invention, it is assumed that the image $I_1$ and the image $I_2$ are acquired by the same camera. In addition, in each embodiment of the present invention, it is assumed that parameters of an objective optical system of the camera do not change. The parameters of the objective optical system are a focal distance, a distortion aberration, a pixel size of an image sensor, and the like. Hereinafter, for the convenience of description, the parameters of the objective optical system will be abbreviated to internal parameters. When such conditions are assumed, the internal parameters describing characteristics of the optical system of the camera can be used in common regardless of the position and the posture of the camera. In each embodiment of the present invention, it is assumed that the internal parameters are acquired at the time of factory shipment. In addition, in each embodiment of the present invention, it is assumed that the internal parameters are known at the time of acquiring an image.

In each embodiment of the present invention, it is assumed that two or more images are acquired by one camera. However, the present invention is not limited to this. For example, the present invention may be applied to also a case in which a 3D model is restored by using a plurality of images acquired by a plurality of cameras. In this case, the image $I_1$ and the image $I_2$ have only to be acquired by using different cameras and each internal parameter has only to be stored for each camera. Even if the internal parameters are unknown, it is possible to perform calculation by using the internal parameters as variables. For this reason, the subsequent procedure does not greatly change in accordance with whether or not the internal parameters are known.

Figure 4:
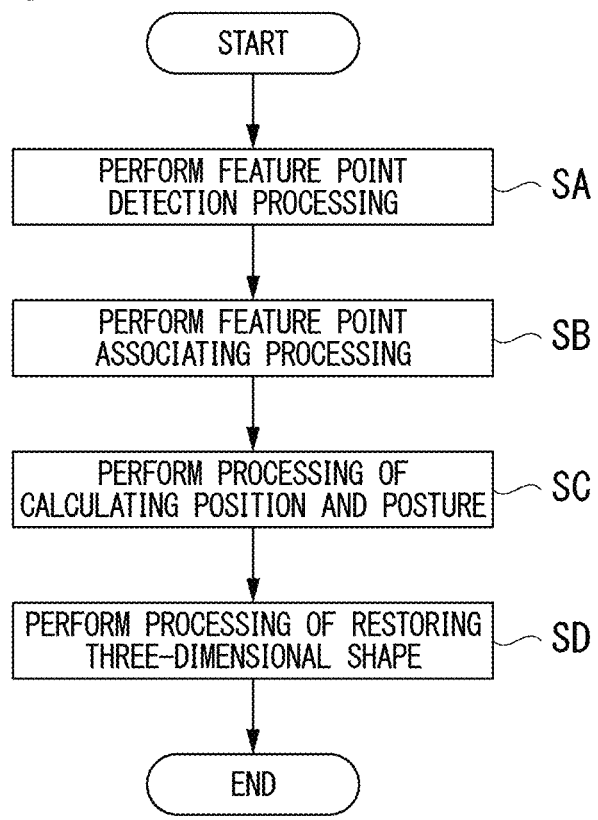
FIG. 4 is a flow chart showing a procedure of processing for generating a three-dimensional model in the first embodiment of the present invention.

A procedure for calculating three-dimensional coordinates of a subject on the basis of acquired two images will be described with reference to FIG. 4. FIG. 4 shows the procedure of processing for generating a 3D model.

First, the 3D model generation unit 212 executes a feature point detection processing (Step SA). The 3D model generation unit 212 detects a feature point of each of acquired two images in the feature point detection processing. The feature point represents a corner, an edge, and the like in which an image luminance gradient is large in information of a subject seen in the image. As a method of detecting this feature point, a scale-invariant feature transform (SIFT), a feature from accelerated segment test (FAST), or the like is used. By using such a method, a feature point within an image can be detected.

FIG. 3 shows an example in which a feature point $m_1$ is detected from the image $I_1$ and a feature point $m_2$ is detected from the image $I_2$. Although only one feature point of each image is shown in FIG. 3, in fact, a plurality of feature points are detected in each image. There is a possibility that the number of feature points detected in each image is different. Each feature point detected from each image is converted into data called a feature quantity. The feature quantity is data that represent a feature of a feature point.

After Step SA, the 3D model generation unit 212 executes a feature point associating processing (Step SB). In the feature point associating processing, the 3D model generation unit 212 compares correlations of feature quantities between images for each feature point detected in the feature point detection processing (Step SA). In a case in which the correlations of the feature quantities are compared and a feature point of which feature quantities are close to those of a feature point of another image is found in each image, the 3D model generation unit 212 stores the information in the hard disk 11 or memory 14. In this way, the 3D model generation unit 212 associates a feature point of each image together. On the other hand, in a case in which a feature point of which feature quantities are close to those of a feature point of another image is not found, the 3D model generation unit 212 discards information of the feature point.

After Step SB, the 3D model generation unit 212 reads coordinates of feature points of two images associated with each other (a feature point pair) from the hard disk 11 or memory 14. The 3D model generation unit 212 executes processing of calculating a position and a posture on the basis of the read coordinates (Step SC). In the processing of calculating a position and a posture, the 3D model generation unit 212 calculates a relative position and a relative posture between the imaging state $c_1$ of the camera that has acquired the image $I_1$ and the imaging state $c_2$ of the camera that has acquired the image $I_2$. More specifically, the 3D model generation unit 212 calculates a matrix E by solving the following Equation (1) using an epipolar restriction.

$$p_1^T E p_2 = 0 \quad E = [t]_X R \quad \because [t]_X = \begin{pmatrix} 0 & -t_z & t_y \\ t_z & 0 & -t_x \\ -t_y & t_x & 0 \end{pmatrix} \quad (1)$$

The matrix E is called a basic matrix. The basic matrix E is a matrix storing a relative position and a relative posture between the imaging state $c_1$ of the camera that has acquired the image $I_1$ and the imaging state $c_2$ of the camera that has acquired the image $I_2$. In Equation (1), a matrix $p_1$ is a matrix including coordinates of a feature point detected from the image $I_1$. A matrix $p_2$ is a matrix including coordinates of a feature point detected from the image $I_2$. The basic matrix E includes information related to a relative position and a relative posture of the camera and thus corresponds to external parameters of the camera. The basic matrix E can be solved by using a known algorithm.

As shown in FIG. 3, Expression (2) and Expression (3) are satisfied in a case in which the amount of position change of the camera is t and the amount of posture change of the camera is R.

$$t = (t_x, t_y, t_z) \quad (2)$$

$$R = R_x(\alpha) R_y(\beta) R_z(\gamma) = \quad (3)$$
$$\begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix}$$

In Expression (2), the amount of movement in an x-axis direction is expressed as $t_x$, the amount of movement in a y-axis direction is expressed as $t_y$, and the amount of movement in a z-axis direction is expressed as $t_z$. In Expression (3), a rotation amount α around the x-axis is expressed as $R_x(\alpha)$, a rotation amount β around the y axis is expressed as $R_y(\beta)$, and a rotation amount γ around the z axis is expressed as $R_z(\gamma)$. After the basic matrix E is calculated, optimization processing called bundle adjustment may be executed in order to improve restoration accuracy of three-dimensional coordinates.

After Step SC, the 3D model generation unit 212 executes processing of restoring a three-dimensional shape of a subject on the basis of the relative position and the relative posture of the camera (the amount of position change t and the amount of posture change R) calculated in Step SC (Step SD). The 3D model generation unit 212 generates a 3D model of a subject in the processing of restoring a three-dimensional shape. As a technique for restoring a three-dimensional shape of a subject, there is matching processing that uses patch-based multi-view stereo (PMVS) and parallelization stereo and the like. However, a means therefor is not particularly limited. When Step SD is executed, the processing shown in FIG. 4 is completed.

Figure 5:
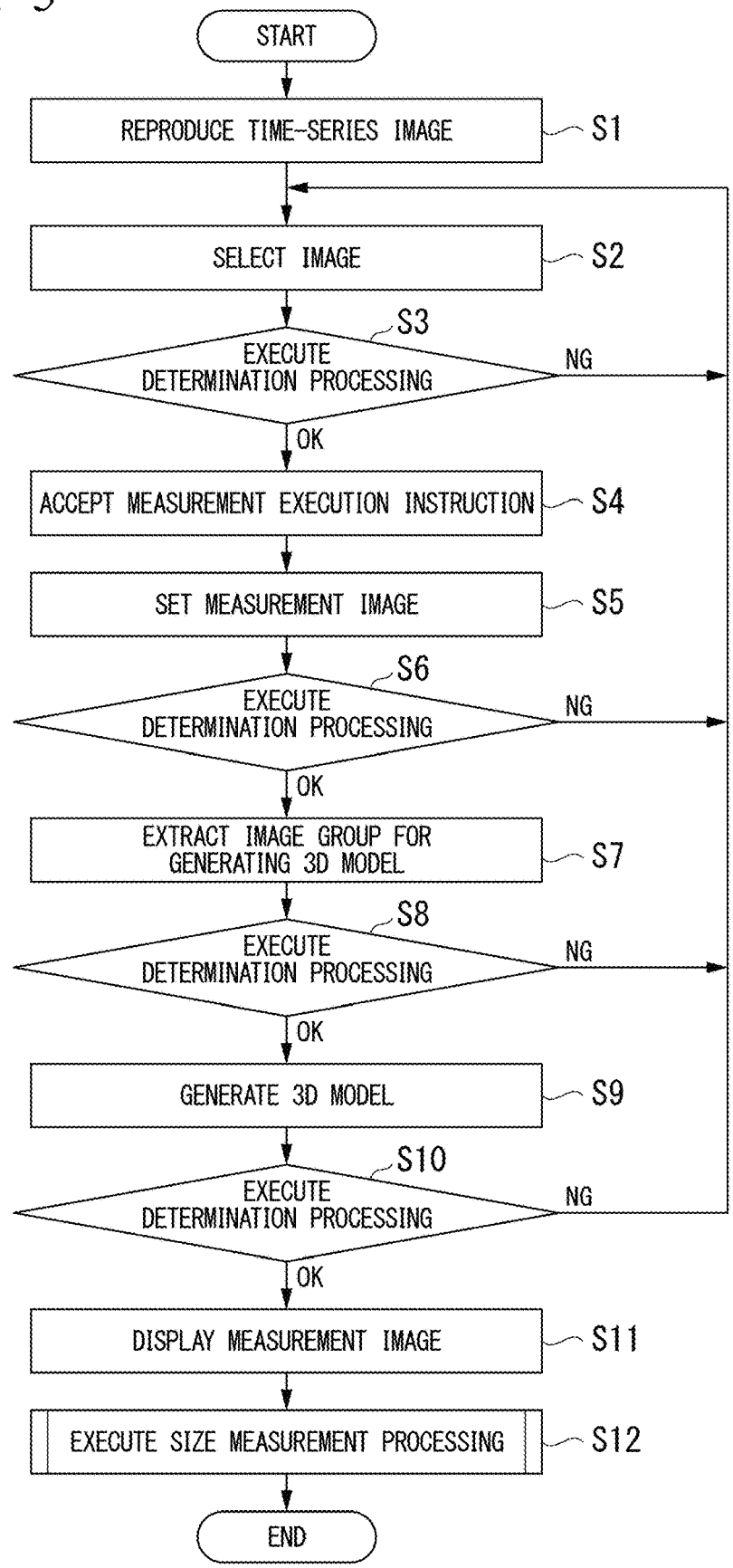
FIG. 5 is a flow chart showing a procedure of processing executed by the measurement device according to the first embodiment of the present invention.

A procedure of processing executed for measurement will be described with reference to FIG. 5. FIG. 5 show a procedure of processing executed by the CPU 13.

The image storage control unit 200 controls the image input device 10 and accepts a time-series image including a plurality of images. The image storage control unit 200 stores the time-series image on the hard disk 11 or the memory 14. The image reproduction control unit 201 reads the time-series image from the hard disk 11 or the memory 14 and displays each image included in the time-series image on the display 15 in order (Step S1).

After the image is displayed, a user confirms each image included in the time-series image by using the basic image reproduction function. A user determines whether or not an object for measurement is on a subject. When a user confirms that the object for measurement is on the subject, the user inputs an image selection instruction by operating the operation unit 12. The reference image selection unit 202 accepts the image selection instruction from the operation unit 12 and selects the image displayed on the display 15 as a reference image (Step S2).

After Step S2, the reference image determination unit 220 determines whether or not the reference image selected in Step S2 is suitable for measurement (Step S3).

Details of processing executed by the reference image determination unit 220 in Step S3 will be described. For example, the reference image determination unit 220 detects a halation region on the basis of the luminance value of an image and calculates a ratio of the halation region to the entire image. When the ratio is greater than a predetermined threshold value, the reference image determination unit 220 determines that the reference image is not suitable for measurement. When the ratio is less than or equal to the predetermined threshold value, the reference image determination unit 220 determines that the reference image is suitable for measurement. When the luminance value of the entire image is less than a predetermined threshold value, the reference image determination unit 220 may determine that the brightness of the image is not enough and the reference image is not suitable for measurement. When the luminance value of the entire image is greater than or equal to the predetermined threshold value, the reference image determination unit 220 may determine that the reference image is suitable for measurement. For example, the luminance value of the entire image is the average of the luminance values of all the pixels in the image.

The reference image determination unit 220 may detect an edge in an image by using, for example, a differential filter and may convert a result of edge detection into a score. In this way, the reference image determination unit 220 can analyze a feature quantity in an image or can analyze a state of occurrence of blur or the like. When the feature quantity is small or the amount of blur is large, the reference image determination unit 220 determines that the reference image is not suitable for measurement. When the feature quantity is large or the amount of blur is small, the reference image determination unit 220 determines that the reference image is suitable for measurement.

When the reference image determination unit 220 determines that the reference image is not suitable for measurement in Step S3, Step S2 is executed. In this case, a user confirms each image included in the time-series image by using the image reproduction function. A user inputs an image selection instruction again.

When the reference image determination unit 220 determines that the reference image is suitable for measurement in Step S3, a measurement execution instruction is accepted (Step S4). For example, a button or the like for inputting the measurement execution instruction is displayed on an image. When a user presses the button by operating the operation unit 12, the measurement execution instruction is accepted. Step S4 is not essential. When the reference image determination unit 220 determines that the reference image is suitable for measurement in Step S3, Step S5 may be executed without Step S4 being executed.

After Step S4, the measurement image setting unit 210 sets the reference image selected in Step S2 as a measurement image. Alternatively, the measurement image setting unit 210 sets one image extracted from the time-series image on the basis of the reference image as a measurement image (Step S5).

A method through which the measurement image setting unit 210 sets a measurement image different from the reference image in Step S5 will be described. For example, the measurement image setting unit 210 extracts one image generated in a predetermined period that is based on the time point at which the reference image is generated from the time-series image. Specifically, the measurement image setting unit 210 extracts an image having a time point in a predetermined period that is after the time point that the reference image has from the time-series image. Alternatively, the measurement image setting unit 210 extracts an image having a time point in a predetermined period that is before the time point that the reference image has from the time-series image. The measurement image setting unit 210 sets the extracted image as a measurement image. The difference between the time point at which the reference image is generated and the time point at which the measurement image is generated is within a predetermined time.

The measurement image setting unit 210 may calculate the amount of movement between a measurement image and each image included in the time-series image. When the amount of movement is less than a predetermined threshold value, the measurement image setting unit 210 may set the image used for calculating the amount of movement as a measurement image.

The image that has been set as a measurement image is stored on the hard disk 11 or the memory 14. For example, a flag representing a measurement image is attached to the image. When processing that uses a measurement image is executed, the image to which the flag has been attached is read from the hard disk 11 or the memory 14 and is used as a measurement image.

After Step S5, the measurement image determination unit 221 determines whether or not the measurement image set in Step S5 is suitable for measurement (Step S6). Step S6 is similar to Step S3 except for the point that an object for processing is the measurement image. When the reference image and the measurement image are the same, Step S7 is executed without Step S6 being executed.

When the measurement image determination unit 221 determines that the measurement image is not suitable for measurement in Step S6, Step S2 is executed. In this case, a user confirms each image included in the time-series image by using the image reproduction function. A user inputs an image selection instruction again.

When the measurement image determination unit 221 determines that the measurement image is suitable for measurement in Step S6, the image extraction unit 211 extracts at least one image different from the measurement image from the time-series image. The image extraction unit 211 stores the at least one extracted image on the hard disk 11 or the memory 14 (Step S7).

Details of processing executed by the image extraction unit 211 in Step S7 will be described. For example, the image extraction unit 211 detects at least one feature point in the measurement image. The image extraction unit 211 detects a point corresponding to the feature point in another image included in the time-series image. The image extraction unit 211 associates the feature point in the measurement image and the point detected in another image with each other. The image extraction unit 211 calculates the amount of movement of the feature point for each image on the basis of a result of associating images. The image extraction unit 211 extracts an image for which the amount of movement greater than or equal to a predetermined value has been calculated.

In a case in which a plurality of images other than the measurement image are necessary, the image extraction unit 211 associates a feature point in an image that has been extracted by using the above-described method and a point in another image by using a method similar to the above-described method. The image extraction unit 211 calculates the amount of movement of the feature point for each image and extracts an image for which the amount of movement greater than or equal to a predetermined value has been calculated. The image extraction unit 211 extracts another image on the basis of a feature point of the newly extracted image. The image extraction unit 211 extracts a necessary number of images by repeating this processing.

After Step S7, the extraction image determination unit 222 determines whether or not at least one image (extraction image) extracted in Step S7 is suitable for measurement (Step S8).

Details of processing executed by the extraction image determination unit 222 in Step S8 will be described. The image extraction unit 211 associates feature points with each other for each image pair in Step S7. The image pair consists of two images for which feature points are associated with each other. The extraction image determination unit 222 uses the result of this processing. When one image is extracted in Step S7, the extraction image determination unit 222 executes determination on the basis of the result of associating feature points between the measurement image and the extraction image. In a case in which at least two images are extracted in Step S7, one of the image pairs includes the measurement image and one extraction image and each of the rest of the image pairs includes two extraction images.

For example, the extraction image determination unit 222 calculates the number of feature points associated with each other between two images. Alternatively, the extraction image determination unit 222 acquires the coordinates of the feature points. When the number of feature points is less than a predetermined value or the distribution of the coordinates of the feature points is biased to some regions in an image, there is a possibility that the accuracy of generating a 3D model deteriorates. For this reason, the extraction image determination unit 222 can determine that the extraction image is not suitable for measurement. When the number of feature points is greater than or equal to a predetermined value or the distribution of the coordinates of the feature points is not biased to some regions in an image, the extraction image determination unit 222 can determine that the extraction image is suitable for measurement.

The extraction image determination unit 222 is able to determine whether or not the distribution of the coordinates of the feature points is biased to some regions by using a method described below. For example, the extraction image determination unit 222 divides an image into four equal regions by dividing the image into two equal parts in the vertical direction and dividing the image into two equal parts in the horizontal direction. When the number of feature points in at least one of the four regions is less than or equal to 1/10 of the number of feature points in another region, the extraction image determination unit 222 can determine that the distribution of the coordinates of the feature points is biased.

When at least two image are extracted in Step S7, the extraction image determination unit 222 executes determination on the basis of the result of associating feature points of each image pair. When at least one image pair is not suitable for measurement, the extraction image determination unit 222 may determine that the extraction image is not suitable for measurement. When all of the image pairs are suitable for measurement, the extraction image determination unit 222 may determine that the extraction image is suitable for measurement. Alternatively, when there is no image pair suitable for measurement, the extraction image determination unit 222 may determine that the extraction image is not suitable for measurement. When at least one image pair is suitable for measurement, the extraction image determination unit 222 may determine that the extraction image is suitable for measurement.

When at least two images are extracted in Step S7, the extraction image determination unit 222 may execute the above-described processing by using only the image pair including part of the images. For example, the extraction image determination unit 222 selects at least one representative image from at least two images extracted in Step S7. The extraction image determination unit 222 executes the above-described processing by using the image pair including the selected image.

When the extraction image determination unit 222 determines that the extraction image is not suitable for measurement in Step S8, Step S2 is executed. In this case, a user confirms each image included in the time-series image by using the image reproduction function. A user inputs an image selection instruction again.

When the extraction image determination unit 222 determines that the extraction image is suitable for measurement in Step S8, the 3D model generation unit 212 estimates the position and the posture of a camera when each image of an image group is generated. The image group includes the measurement image set in Step S5 and at least one image extracted in Step S7. The 3D model generation unit 212 generates a 3D model of a subject on the basis of the estimated position and posture (Step S9). The generated 3D model is stored on the hard disk 11 or the memory 14. Step S9 includes the processing shown in FIG. 4.

After Step S9, the model image determination unit 223 determines whether or not the image group used for generating the 3D model is suitable for measurement (Step S10).

Details of processing executed by the model image determination unit 223 in Step S10 will be described. For example, the model image determination unit 223 calculates the difference (reprojection error) between an ideal straight line (epipolar line) and coordinates on a two-dimensional image when a point on the 3D model is projected on the two-dimensional image again. The reprojection error represents the accuracy of estimating the position and the posture of a camera. The model image determination unit 223 calculates the average of the reprojection errors of a plurality of points for each image of the image group. When the average is greater than a predetermined value, the model image determination unit 223 determines that the image used for calculating the average is not suitable for measurement. When the average is less than or equal to the predetermined value, the model image determination unit 223 determines that the image used for calculating the average is suitable for measurement.

The model image determination unit 223 may use a result of the matching processing in Step SD. For example, the model image determination unit 223 may use a correlation value of each pixel obtained in the matching processing. When the average of correlation values of a plurality of pixels is less than a predetermined value, the model image determination unit 223 determines that the image used for calculating the average is not suitable for measurement. When the average is greater than or equal to the predetermined value, the model image determination unit 223 determines that the image used for calculating the average is suitable for measurement.

When at least one image included in the image group is not suitable for measurement, the model image determination unit 223 may determine that the image group is not suitable for measurement. When all the images included in the image group is suitable for measurement, the model image determination unit 223 may determine that the image group is suitable for measurement. Alternatively, when there is no image suitable for measurement in the image group, the model image determination unit 223 may determine that the image group is not suitable for measurement. When at least one image included in the image group is suitable for measurement, the model image determination unit 223 may determine that the image is suitable for measurement.

The model image determination unit 223 may execute the above-described processing by using only part of at least two images used for generating the 3D model. For example, the model image determination unit 223 selects at least one representative image from at least two images used for generating the 3D model. The model image determination unit 223 executes the above-described processing by using the selected image.

When the model image determination unit 223 determines that the image group is not suitable for measurement in Step S10, Step S2 is executed. In this case, a user confirms each image included in the time-series image by using the image reproduction function. A user inputs an image selection instruction again.

When the model image determination unit 223 determines that the image group is suitable for measurement in Step S10, the image display unit 231 displays the measurement image set in Step S5 on the display 15 (Step S11).

After Step S11, size measurement processing is executed (Step S12). When the size measurement processing is executed, the processing shown in FIG. 5 is completed.

Figure 6:
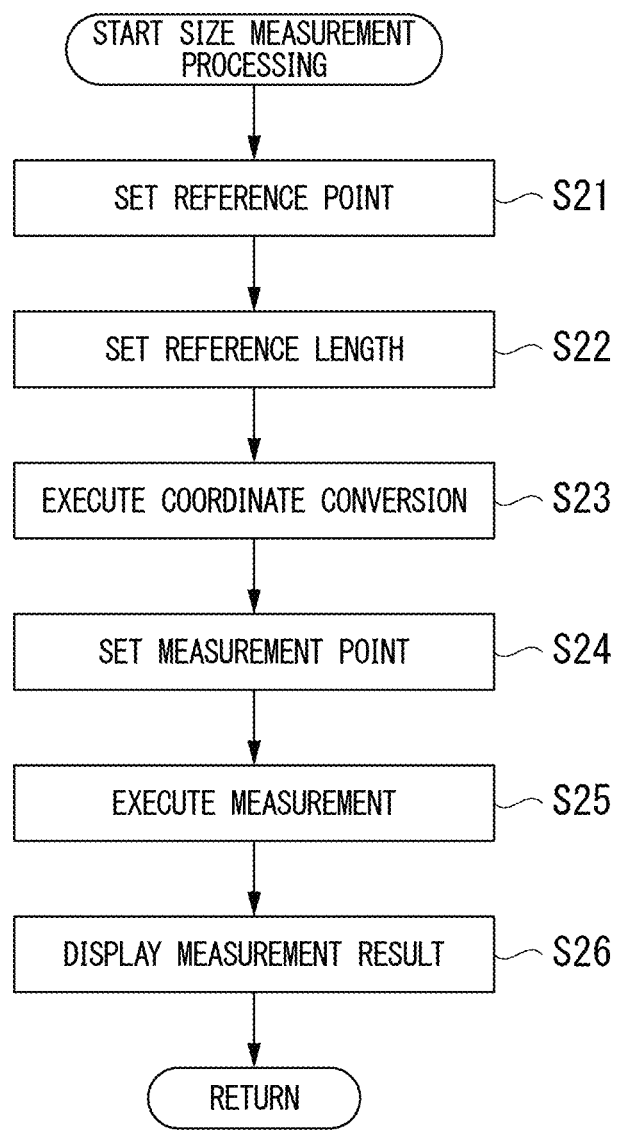
FIG. 6 is a flow chart showing a procedure of processing executed by the measurement device according to the first embodiment of the present invention.

A procedure of the size measurement processing in Step S12 will be described with reference to FIG. 6. FIG. 6 show a procedure of processing executed by the CPU 13.

Hereinafter, for the convenience of description, a case in which the minimum number of designation points necessary for executing measurement is designated by a user is assumed. The minimum number is four. Even when the number of designation points exceeds four, the method of measurement is basically the same as that in a case in which four points are designated. For this reason, cases in which more than four points are designated will not be described.

Hereinafter, two reference points are designated and the reference length between the two reference points are designated. Hereinafter, two measurement points are designated.

After the measurement image is displayed on the display 15, a user designates a reference point, a reference length, and a measurement point. Hereinafter, an example in which a user designates two reference points, a reference length, and two measurement points in this order will be described. There is no limitation to this order and the order may be changed.

A user designates two reference points on the measurement image displayed on the display 15 by operating the operation unit 12. The reference point setting unit 230 accepts the two reference points designated by a user from the operation unit 12. The reference point setting unit 230 sets the two reference points designated by a user on the measurement image (Step S21). In a case in which the display 15 is a touch panel, a user can designate each reference point by touching the position of each reference point on the display 15.

After the two reference points are designated, a user designates a reference length that represents the distance between the two reference points by operating the operation unit 12. A user designates the length that the user already knows as a numerical value. The reference length setting unit 232 accepts the reference length designated by a user from the operation unit 12. The reference length setting unit 232 sets the reference length designated by a user to the measurement image (Step S22).

After Step S22, the coordinate conversion unit 233 converts the 3D model generated in Step S9 into a 3D model having the dimension of length (Step S23). At this time, the coordinate conversion unit 233 uses the two reference points set in Step S21 and the reference length set in Step S22.

It is not essential to input a reference length. For example, in a case in which the distance between the two reference points is normalized as "1" or "100%", measurement of the relative size is possible. For example, in a case in which the reference length is set to 2 mm, measurement of the absolute size having the dimension of length is possible.

After the reference length is designated, a user designates two measurement points on the image displayed on the display 15 by operating the operation unit 12. The measurement point setting unit 234 accepts the two measurement points designated by a user from the operation unit 12. The measurement point setting unit 234 sets the two measurement points designated by a user on the image displayed on the display 15 (Step S24). In a case in which the display 15 is a touch panel, a user can designate each measurement point by touching the position of each measurement point on the display 15.

After Step S24, the measurement unit 235 detects a point on the 3D model corresponding to each of the two measurement points. The measurement unit 235 measures the size defined by the two measurement points designated by a user on the basis of three-dimensional coordinates of each detected point (Step S25).

After Step S25, the image display unit 231 displays the size measured in Step S25 as a measurement result on the display 15 (Step S26). For example, the measurement result is superimposed on the image displayed on the display 15. When Step S26 is executed, the size measurement processing is completed.

The processing executed in the size measurement processing is not limited to the processing shown in FIG. 6. For example, the size measurement processing may include processing for selecting a measurement mode. A plurality of measurement modes may be prepared. The plurality of measurement modes may include a mode for measuring the distance between two points as described above. The plurality of measurement modes may include a mode for measuring the distance between one point and a reference straight line. The plurality of measurement modes may include a mode for measuring the distance between one point and a reference plane. The plurality of measurement modes may include a mode different from the above-described modes. The number of measurement points necessary for measurement is different in accordance with the measurement mode.

The processing shown in FIG. 5 includes four pieces of determination processing (Step S3, Step S6, Step S8, and Step S10). Not all the four pieces of determination processing need to be executed. For example, Step S3 and Step S6 may be omitted and only Step S8 and Step S10 may be executed. Alternatively, Step S8 and Step S10 may be omitted and only Step S3 and Step S6 may be executed. Only one of the four pieces of determination processing may be executed.

When an image is determined to be not suitable for measurement in one of the four pieces of determination processing, Step S5 may be executed. In this case, the measurement image setting unit 210 sets an image different from the measurement image set at the time of executing Step S5 last time as a measurement image.

The order of processing executed by the CPU 13 is not limited to the order shown in FIG. 5. For example, Step S11 may be executed at any timing between Step S5 and Step S12. Step S10 may be executed at any timing between Step S9 and Step S25.

A measurement method according to each aspect of the present invention includes a selection step, an image setting step, an extraction step, a generation step, a determination step, a first image display step, a point setting step, and a measurement step. When a first instruction for selecting one first image (reference image) included in a plurality of two-dimensional images of a subject is accepted through the operation unit 12 (input device), the reference image selection unit 202 selects the first image in the selection step (Step S2). The measurement image setting unit 210 sets one of one second image and the first image as a measurement image in the image setting step (Step S5). The second image is extracted from the plurality of two-dimensional images on the basis of the first image. After the image setting step is executed, the image extraction unit 211 extracts at least one third image different from the measurement image from the plurality of two-dimensional images in the extraction step (Step S7). The viewpoint of a camera when each image of an image group is generated and the viewpoint of the camera when another image of the image group is generated are different from each other. The image group consists of the measurement image and at least one third image.

After the extraction step is executed, the 3D model generation unit 212 generates a three-dimensional shape (3D model) of the subject on the basis of the position and the posture of the camera. The position and the posture are a position and a posture, respectively, when each image of the image group is generated. The image determination unit 22 determines whether or not an image is suitable for measurement with respect to at least one of the first image, the measurement image, and the third image in the determination step (Step S3, Step S6, Step S8, and Step S10). In other words, the image determination unit 22 determines whether or not an object image that is at least one of the first image, the measurement image, and the third image is suitable for measurement. The image display unit 231 displays the measurement image on the display 15 in the first image display step (Step S1). After the measurement image is displayed, the measurement point setting unit 234 sets at least two measurement points on the measurement image in the point setting step (Step S24). Only when the image determination unit 22 determines that the image is suitable for measurement in the determination step, the measurement unit 235 measures the size of the subject on the basis of at least two measurement points and the three-dimensional shape in the measurement step (Step S25). The determination step is executed at least once between an execution timing of the selection step and an execution timing of the measurement step.

The image group is used for generating a 3D model. In order for the 3D model to be generated in accordance with the principle shown in FIG. 3, part of a visual field of each image and part of a visual field of each of at least one of other images need to be common. A visual field of the measurement image (first visual field) and a visual field of one third image (second visual field) include a common region. A region other than the common region in the first visual field and a region other than the common region in the second visual field are different from each other.

The determination step is executed at one or more of first to fourth timings. The first timing is between an execution timing of the selection step and an execution timing of the image setting step. The second timing is between an execution timing of the image setting step and an execution timing of the extraction step. The third timing is between an execution timing of the extraction step and an execution timing of the generation step. The fourth timing is between an execution timing of the generation step and an execution timing of the measurement step.

When the image determination unit 22 determines that the image is not suitable for measurement in the determination step, the selection step or the image setting step is executed again. After the selection step is executed again, the image setting step is executed again. After the image setting step is executed again, at least part of a sequence including the extraction step, the generation step, the determination step, the first image display step, the point setting step, and the measurement step is executed again.

When the selection step is executed again, a first image different from a first image selected in the selection step of the last time is expected to be selected. For this reason, there is a possibility that an image different from a measurement image set in the image setting step of the last time is set as a measurement image when the image setting step is executed again. There is a possibility that an image different from a measurement image set in the image setting step of the last time is set as a measurement image also when the image is determined to be not suitable for measurement and the image setting step is executed again. For this reason, when the determination step is executed again, the possibility that the image is determined to be suitable for measurement increases.

The determination step may be executed at least once between an execution timing of the extraction step and an execution timing of the measurement step. In this case, the determination step may be executed between an execution timing of the selection step and an execution timing of the extraction step or the determination step may not be executed between the execution timing of the selection step and the execution timing of the extraction step.

The image extraction unit 211 may trace feature points of each image included in a plurality of two-dimensional images between the images in the extraction step. The determination step may be executed between an execution timing of the extraction step and an execution timing of the generation step. The image determination unit 22 may execute the determination step on the basis of a result that the image extraction unit 211 traces the feature points.

The determination step may be executed between an execution timing of the generation step and an execution timing of the measurement step. The image determination unit 22 may execute the determination step (Step S10) on the basis of a result that the 3D model generation unit 212 generates the three-dimensional shape.

In the first embodiment, the image determination unit 22 determines the suitability of an image for measurement before the measurement step is executed. Only when the image determination unit 22 determines that the image is suitable for measurement, the measurement unit 235 executes measurement. Since an image not suitable for measurement is less likely to be used in processing for measurement, the measurement device 1 can reduce the possibility that a measurement result with low accuracy is obtained. The measurement device 1 can obtain a measurement result with high reliability, compared to a case in which the above-described determination is not executed.

When an image is determined to be not suitable for measurement in Step S3 or Step S6, the measurement device 1 can avoid executing useless processing. The processing time for obtaining a determination result in Step S8 or Step S10 is longer than the processing time for obtaining a determination result in Step S3 or Step S6. However, an effect described below is obtained in a case in which the determination is executed in Step S8 or Step S10. In Step S8 or Step S10, the determination is executed on the basis of a result of processing a plurality of images used for generating a 3D model. For this reason, the accuracy of the determination is high, compared to a case in which the determination is executed on the basis of one image.

Second Embodiment

Figure 7:
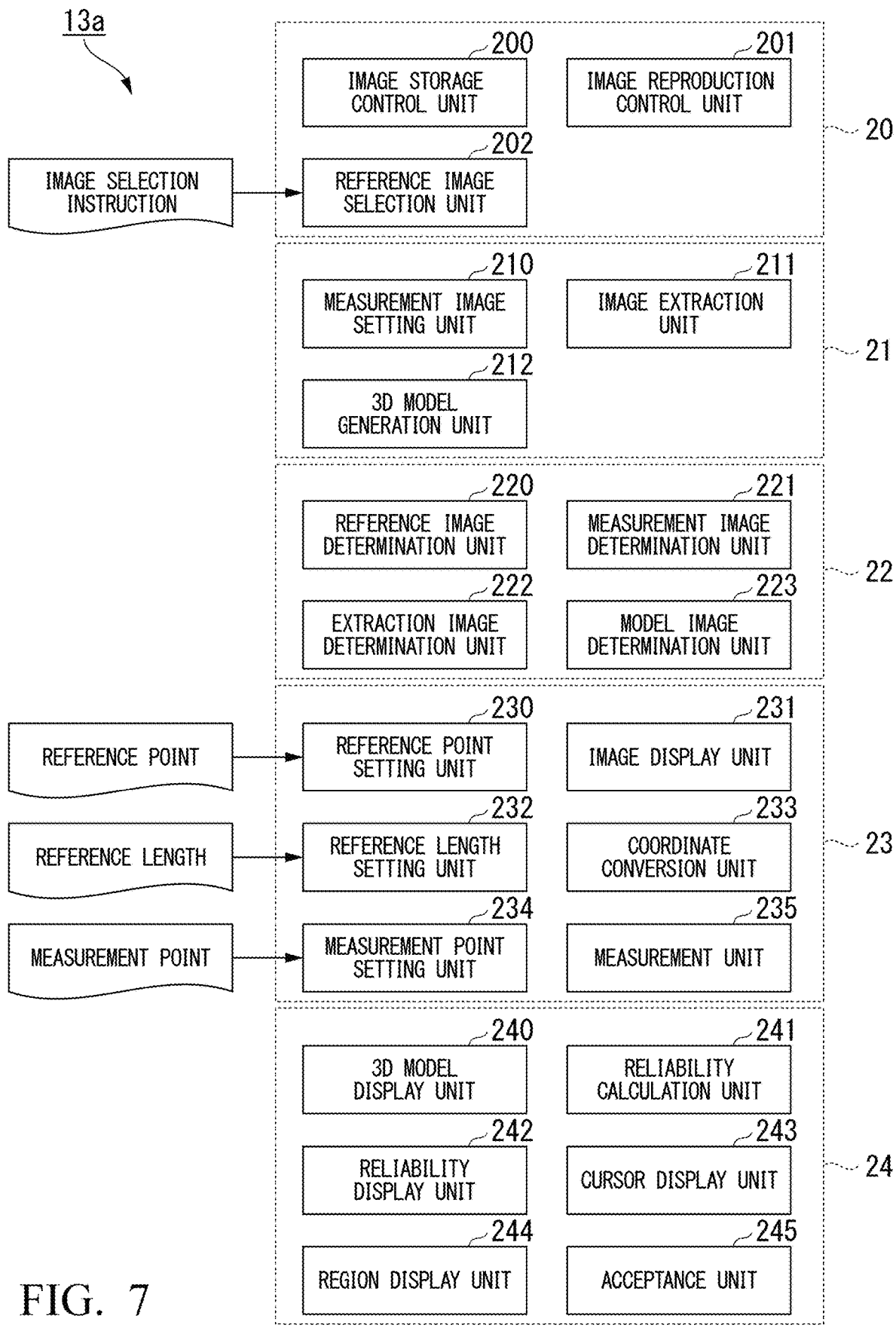
FIG. 7 is a block diagram showing a functional configuration of a CPU included in a measurement device according to a second embodiment of the present invention.

In the second embodiment of the present invention, the CPU 13 shown in FIG. 2 is changed to a CPU 13*a* shown in FIG. 7. FIG. 7 shows a functional configuration of the CPU 13*a*. The same configuration as the configuration shown in FIG. 2 will not be described. At least one of blocks shown in FIG. 7 may be constituted by a circuit other than the CPU 13*a*.

Each unit shown in FIG. 7 may be constituted by at least one of a processor and a logic circuit. Each unit shown in FIG. 7 may include one or a plurality of processors. Each unit shown in FIG. 7 may include one or a plurality of logic circuits.

An image reproduction unit 20, a 3D model acquisition unit 21, an image determination unit 22, a measurement processing unit 23, and an OK processing unit 24 constitute the functions of the CPU 13*a*. The OK processing unit 24 includes a 3D model display unit 240, a reliability calculation unit 241, a reliability display unit 242, a cursor display unit 243, a region display unit 244, and an acceptance unit 245.

The 3D model display unit 240 displays an image (3D image) of a 3D model generated by the 3D model generation unit 212 on the display 15. The reliability calculation unit 241 calculates the reliability of each position on the 3D model on the basis of an image group used for generating the 3D model. The reliability represents the accuracy of the size of a subject measured in a case in which it is assumed that the size measurement processing is executed. In other words, the reliability represents an expected value of the accuracy of a measurement result. The reliability calculation unit 241 calculates the reliability before the size measurement processing is executed. Details of processing executed by the reliability calculation unit 241 will be described later. The reliability display unit 242 displays the reliability calculated by the reliability calculation unit 241 on the 3D image.

The cursor display unit 243 displays a first cursor on a measurement image. A position on the measurement image and a position on the 3D model are associated with each other. The cursor display unit 243 calculates a position on the 3D model corresponding to the position of the first cursor on the basis of the relationship between a position on the measurement image and a position on the 3D model. The cursor display unit 243 displays a second cursor at the position on the 3D image corresponding to the position of the first cursor.

The 3D model does not necessarily have three-dimensional coordinates corresponding to all pixels of the measurement image. In a case in which a pixel for which the 3D model generation unit 212 is unable to generate a 3D model is on the measurement image, the part corresponding to the pixel is lost in the 3D model. The part does not have three-dimensional coordinates. In a case in which a position on the 3D model corresponding to a measurement point designated by a user does not have three-dimensional coordinates, the measurement unit 235 is unable to execute measurement. The region display unit 244 displays a region including a position on the measurement image that does not correspond to a position on a three-dimensional shape as a measurement-impossible region on the measurement image. The acceptance unit 245 accepts information input by a user through the operation unit 12.

The OK processing unit 24 may include only the 3D model display unit 240. The OK processing unit 24 may include the 3D model display unit 240 and may include only the reliability calculation unit 241 and the reliability display unit 242. The OK processing unit 24 may include the 3D model display unit 240 and may include only the cursor display unit 243. The OK processing unit 24 may include the 3D model display unit 240 and may include only the region display unit 244.

Figure 8:
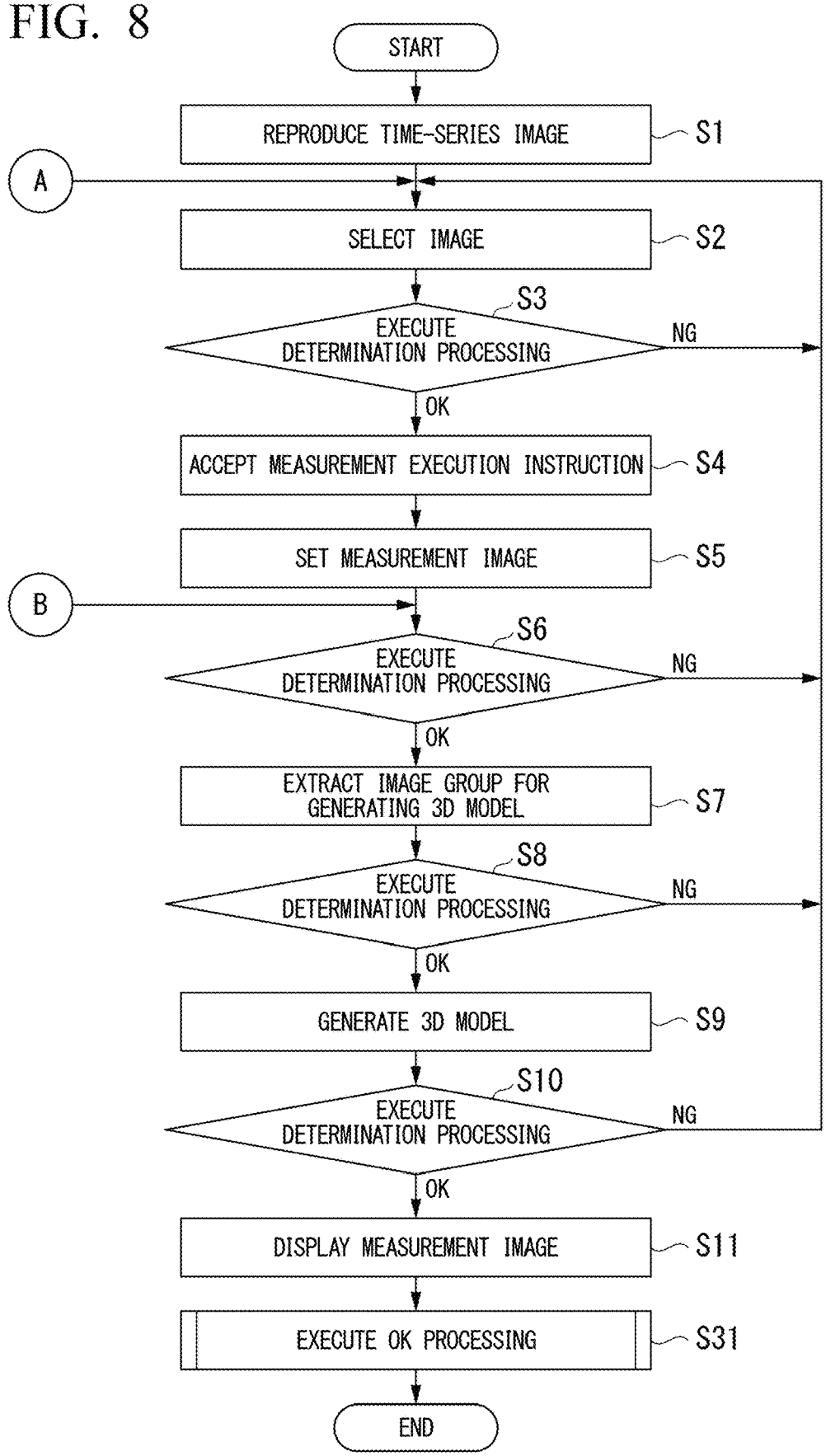
FIG. 8 is a flow chart showing a procedure of processing executed by the measurement device according to the second embodiment of the present invention.

The processing shown in FIG. 5 is changed to processing shown in FIG. 8. A procedure of processing executed for measurement will be described with reference to FIG. 8. FIG. 8 shows a procedure of processing executed by the CPU 13*a*. The same processing as the processing shown in FIG. 5 will not be described.

After Step S11, OK processing is executed (Step S31). When the OK processing is executed, the processing shown in FIG. 8 is completed.

Figure 9:
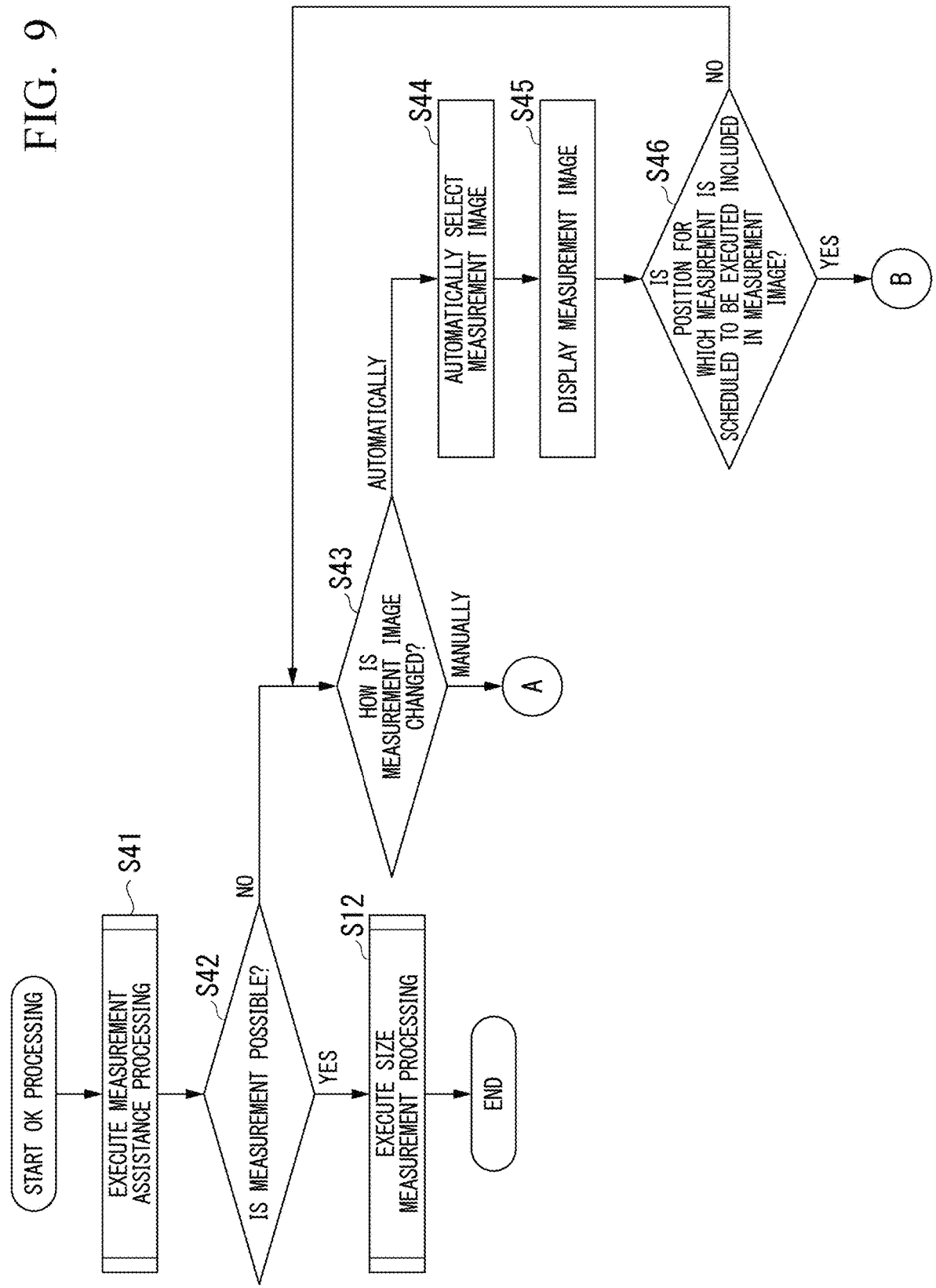
FIG. 9 is a flow chart showing a procedure of processing executed by the measurement device according to the second embodiment of the present invention.

A procedure of the OK processing in Step S31 will be described with reference to FIG. 9. FIG. 9 shows a procedure of processing executed by the CPU 13*a*.

When the OK processing is started, measurement assistance processing is executed (Step S41). It is extremely difficult to restore a three-dimensional shape for all pixels on a measurement image. There is a case in which there is a region for which a three-dimensional shape has not been restored. Alternatively, there is a case in which there is a region for which a three-dimensional shape has been restored but the reliability of the region is low. In the measurement assistance processing, information of the region is presented to a user.

Figure 10:
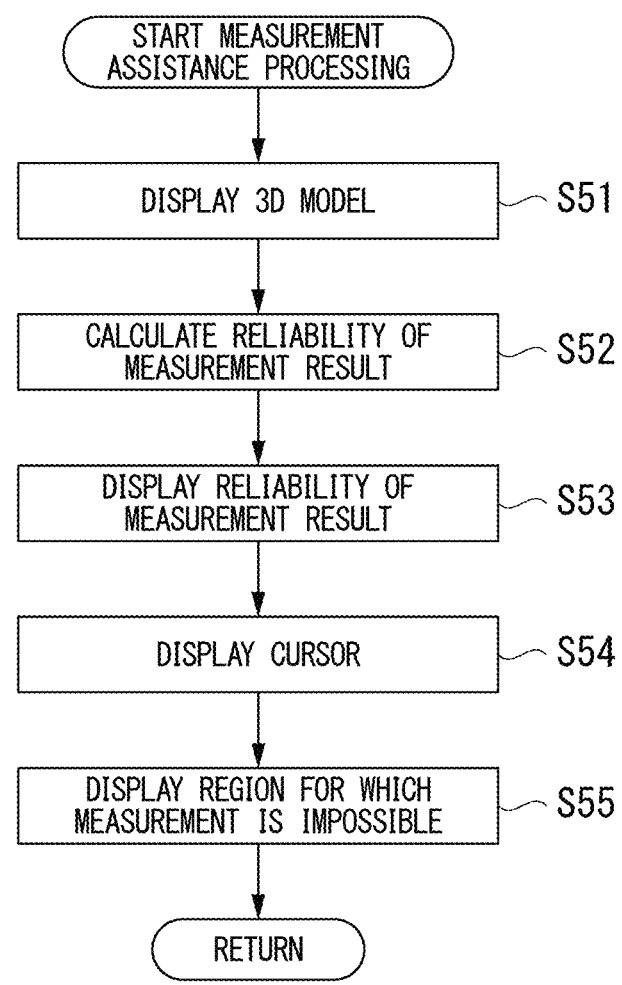
FIG. 10 is a flow chart showing a procedure of processing executed by the measurement device according to the second embodiment of the present invention.

A procedure of the measurement assistance processing in Step S41 will be described with reference to FIG. 10. FIG. 10 shows a procedure of processing executed by the CPU 13*a*.

The 3D model display unit 240 displays a 3D image on the display 15 (Step S51).

Figure 11:
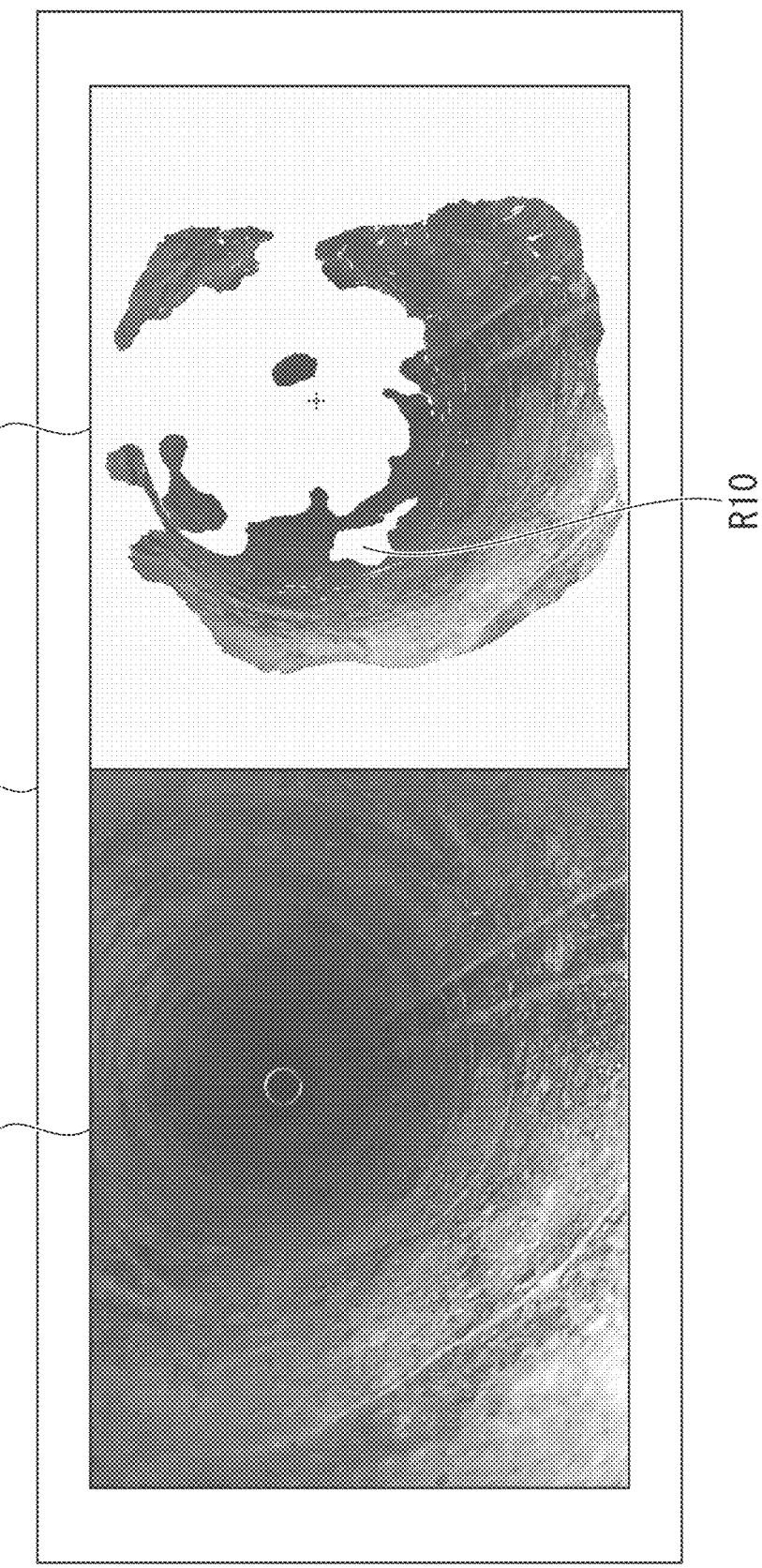
FIG. 11 is a diagram showing an example of an image displayed on a display included in the measurement device according to the second embodiment of the present invention.

FIG. 11 shows an example of an image displayed on the display 15 in Step S51. A measurement image G10 is displayed on the screen of the display 15 in Step S11. A 3D image G20 is displayed on the screen of the display 15 in Step S51. The measurement image G10 and the 3D image G20 are arranged in the horizontal direction. The measurement image G10 and the 3D image G20 may be arranged in the vertical direction. In the example shown in FIG. 11, the measurement image G10 and the 3D image G20 do not overlap each other. Part of the measurement image G10 and part of the 3D image G20 may overlap each other.

In a region R10 of the 3D image, a three-dimensional shape has not been restored. For this reason, there are no data of three-dimensional coordinates in the region RI. In the region R10, execution of measurement is impossible. A user can confirm in which region on the measurement image G10 a three-dimensional shape has not been restored.

After Step S51, the reliability calculation unit 241 calculates the reliability of each position on the 3D model on the basis of the image group used for generating the 3D model (Step S52).

Details of processing executed by the reliability calculation unit 241 in Step S52 will be described. For example, the reliability calculation unit 241 calculates the reliability on the basis of a result of the matching processing in Step SD. A correlation value of each pixel is obtained in the matching processing. In a case in which the correlation value is small, the reliability is low. In a case in which the correlation value is large, the reliability is high.

The reliability calculation unit 241 may calculate the reliability on the basis of the brightness of the image group, the texture of the image group, the state of blur of the image group, or the like. For example, the reliability of a pixel included in a halation region is low. The reliability of a pixel not included in a halation region is high. Alternatively, the reliability of a pixel included in a region in which the feature quantity is small is low. The reliability of a pixel included in a region in which the feature quantity is large is high. Alternatively, the reliability of a pixel greatly affected by blur is low. In a case in which the distance between a camera and a subject is small, a pixel is greatly affected by blur. The reliability of a pixel not affected by blur very much is high. In a case in which the distance between a camera and a subject is large, a pixel is not affected by blur very much.

After Step S52, the reliability display unit 242 displays the reliability calculated in Step S52 on the 3D image (Step S53).

Figure 12:
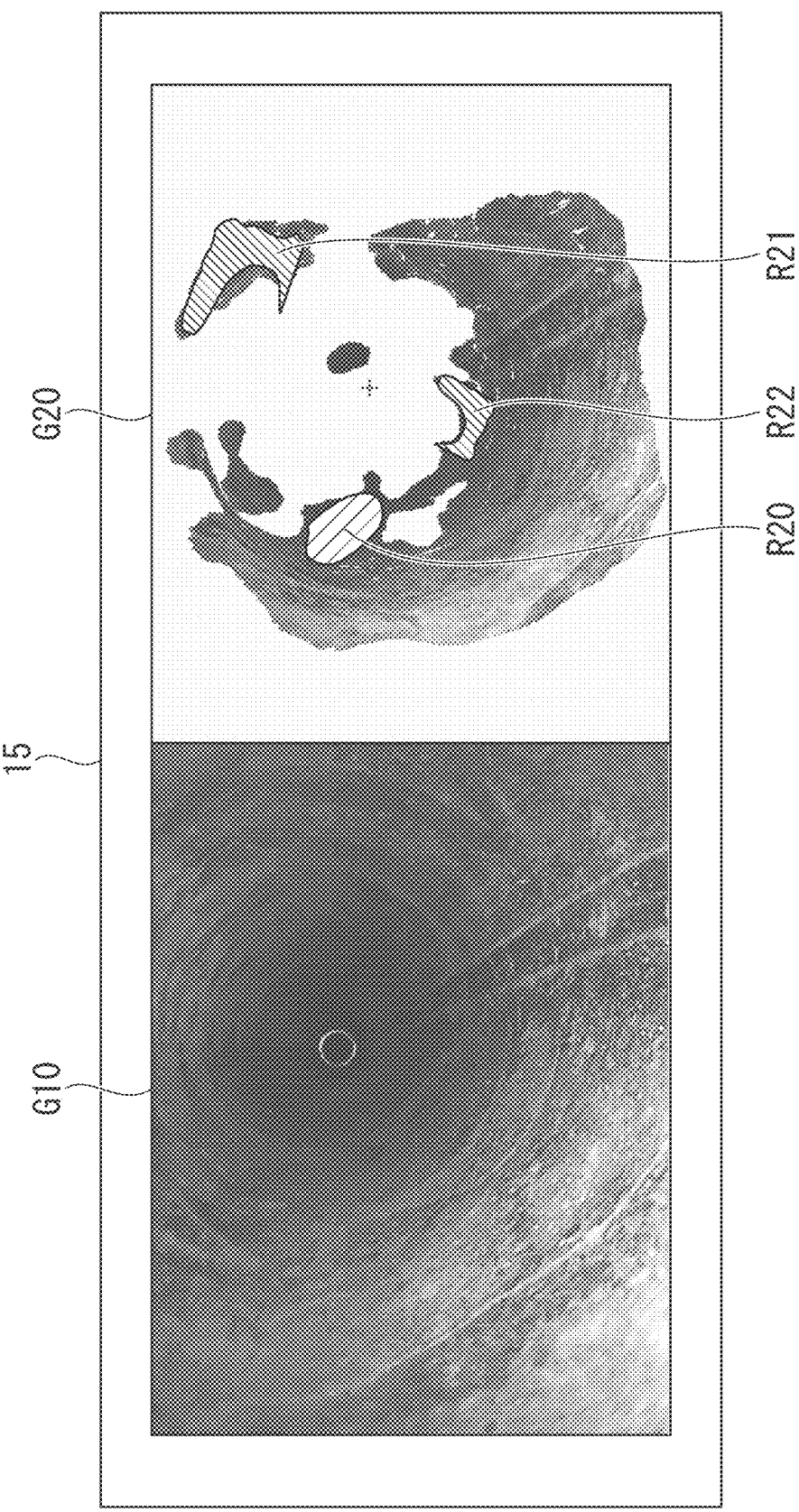
FIG. 12 is a diagram showing an example of an image displayed on the display included in the measurement device according to the second embodiment of the present invention.

FIG. 12 shows an example of an image displayed on the display 15 in Step S53. The same part as the part shown in FIG. 11 will not be described. A region R20, a region R21, and a region R22 are displayed on a 3D image G20. The region R20 is a region having the low reliability. The region R21 and the region R22 are a region having the reliability that falls within a medium range. The reliability of regions on the 3D image G20 other than the above-described regions is high. For example, each region is displayed in a color corresponding to the reliability. A value that represents the reliability may be displayed on each region. As long as a user can recognize the reliability, a method of displaying the reliability is not limited to the above-described method. A user can understand the reliability of the position for which measurement is scheduled to be executed. A user can avoid execution of measurement for a position having the low reliability.

After Step S53, the cursor display unit 243 displays a first cursor on the measurement image. The cursor display unit 243 displays a second cursor at a position on the 3D image corresponding to the position of the first cursor (Step S54).

Figure 13:
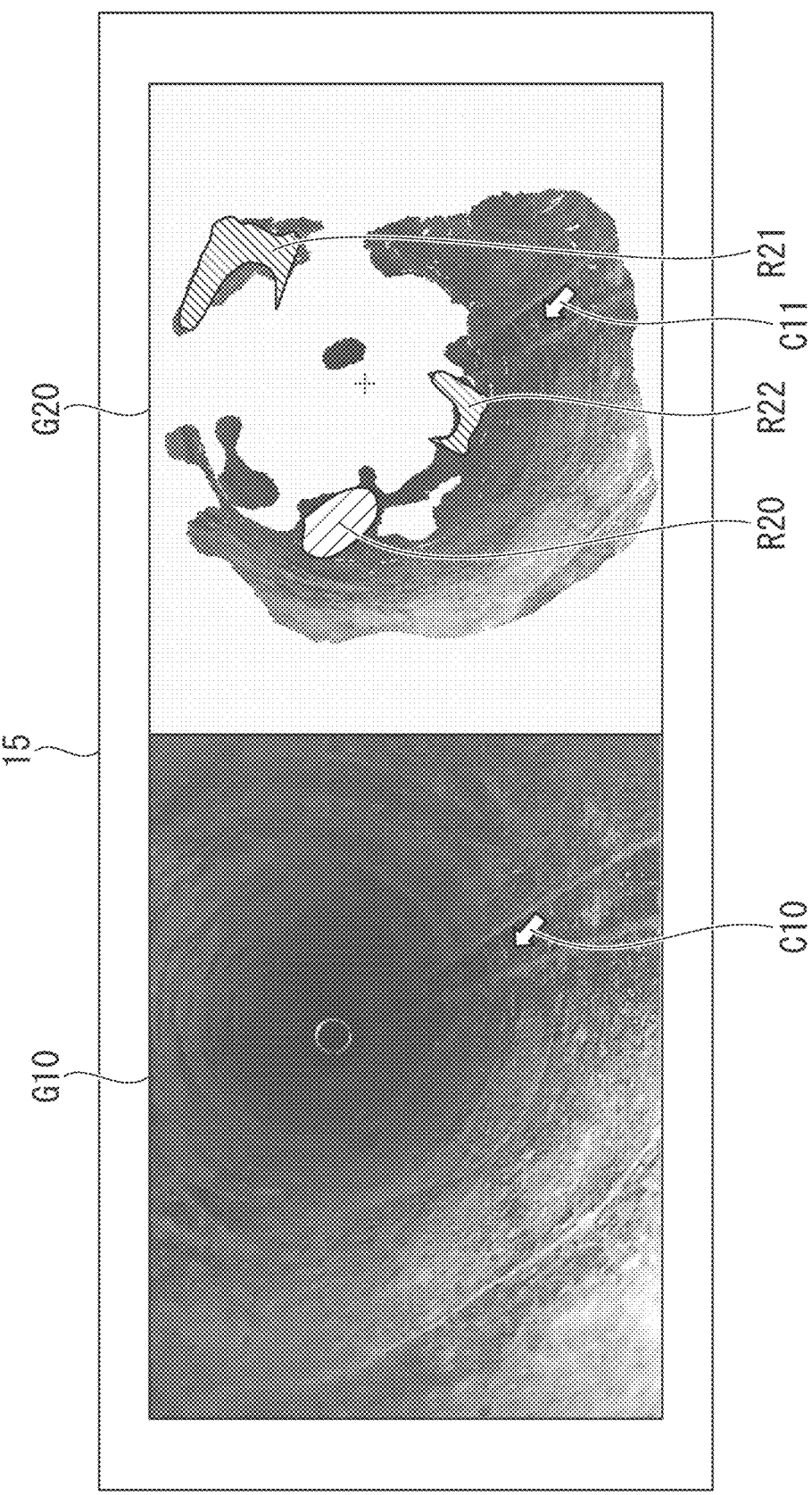
FIG. 13 is a diagram showing an example of an image displayed on the display included in the measurement device according to the second embodiment of the present invention.

FIG. 13 shows an example of an image displayed on the display 15 in Step S54. The same part as the part shown in FIG. 12 will not be described. A first cursor C10 is displayed on a measurement image G10 and a second cursor C11 is displayed on a 3D image G20. The first cursor C10 may be first displayed at a predetermined position on the measurement image G10.

A user can move the first cursor C10 by operating the operation unit 12. A user inputs position information of the first cursor C10 to the operation unit 12. The acceptance unit 245 accepts the position information from the operation unit 12. The cursor display unit 243 detects the position on the measurement image G10 represented by the position information. The cursor display unit 243 displays the first cursor C10 at the detected position. The cursor display unit 243 calculates a position on the 3D image G20 corresponding to the position of the first cursor C10 on the basis of the relationship between a position on the measurement image G10 and a position on the 3D image G20. The cursor display unit 243 displays the second cursor C11 at the calculated position. The position of the first cursor C10 and the position of the second cursor C11 are updated on a regular basis. In a case in which the display 15 is a touch panel, a user can input the position information of a cursor to the operation unit 12 by touching a position on the measurement image G10.

Since the first cursor C10 and the second cursor C11 are displayed, a user can understand the position relationship between the measurement image G10 and the 3D image G20. A user can understand a position on the measurement image G10 for which a three-dimensional shape has not been restored and a position on the measurement image G10 at which the reliability is low.

After Step S54, the region display unit 244 displays a measurement-impossible region on the measurement image (Step S55). When Step S55 is executed, the measurement assistance processing shown in FIG. 6 is completed.

Figure 14:
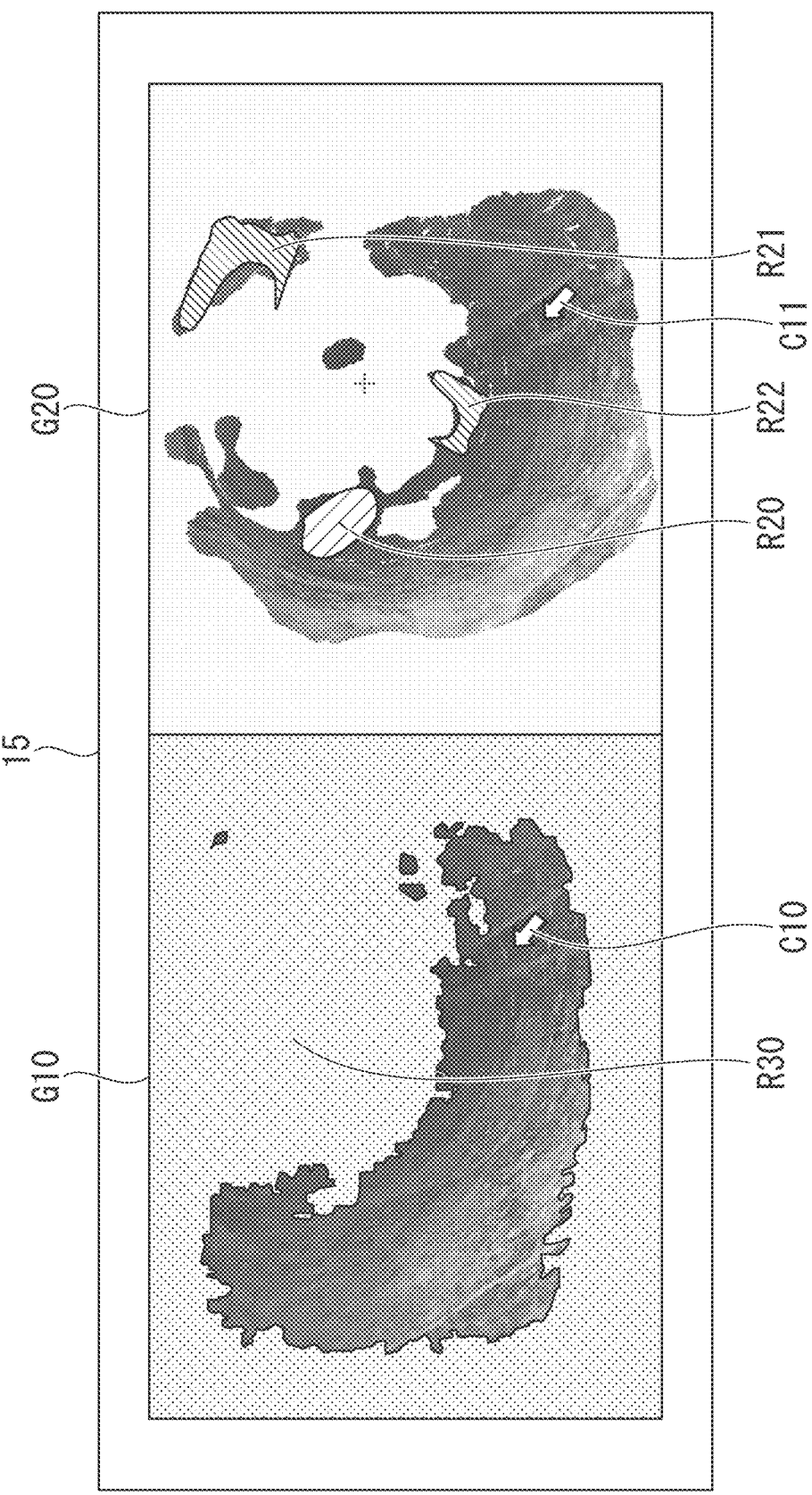
FIG. 14 is a diagram showing an example of an image displayed on the display included in the measurement device according to the second embodiment of the present invention.

FIG. 14 shows an example of an image displayed on the display 15 in Step S55. The same part as the part shown in FIG. 13 will not be described. A region R30 is displayed on a measurement image G10. The region R30 is a region for which the measurement unit 235 is unable to execute measurement. Since a three-dimensional shape has not been restored in the region R30, each position in the region R30 does not correspond to a position on the three-dimensional shape. For example, the region R30 is displayed in a color that represents that execution of measurement is impossible. As long as a user can recognize that execution of measurement is impossible, a method of displaying the measurement-impossible region is not limited to the above-described method. A user can understand a position on the measurement image G10 for which execution of measurement is impossible and can avoid execution of measurement for the position.

FIG. 9 will be referred to again. After Step S41, a user determines whether or not execution of measurement is possible for a position for which measurement is scheduled to be executed. A user inputs a determination result by operating the operation unit 12. The acceptance unit 245 accepts the determination result from the operation unit 12 (Step S42).

When the acceptance unit 245 accepts the determination result that represents that execution of measurement is possible in Step S42, the size measurement processing (Step S12) is executed. When the size measurement processing is executed, the OK processing shown in FIG. 9 is completed.

When the determination result that represents that execution of measurement is impossible is accepted in Step S42, the measurement image needs to be changed. A user inputs information that represents a method of changing the measurement image by operating the operation unit 12. The method of changing the measurement image is either manual change or automatic change. The acceptance unit 245 accepts the information from the operation unit 12 (Step S43).

When the acceptance unit 245 accepts the information that represents the manual change in Step S43, Step S2 is executed. In this case, a user confirms each image included in the time-series image by using the image reproduction function. A user inputs an image selection instruction again. The reference image is manually changed and a measurement image is set in Step S5 on the basis of the changed reference image.

When the acceptance unit 245 accepts the information that represents the automatic change in Step S43, the measurement image setting unit 210 extracts one image different from a measurement image set at the time of executing Step S5 last time from the time-series image. The measurement image setting unit 210 sets the extracted image as a measurement image (Step S44).

A method through which the measurement image setting unit 210 sets a measurement image in Step S44 will be described. For example, the measurement image setting unit 210 extracts one image generated in a predetermined period that is based on the time point at which the reference image set last time is generated from the time-series image. Specifically, the measurement image setting unit 210 extracts an image having a time point in a predetermined period that is after the time point that the reference image has from the time-series image. Alternatively, the measurement image setting unit 210 extracts an image having a time point in a predetermined period that is before the time point that the reference image has from the time-series image. The measurement image setting unit 210 sets the extracted image as a new measurement image. The difference between the time point at which the old measurement image is generated and the time point at which the new measurement image is generated is within a predetermined time.

The measurement image setting unit 210 may calculate the amount of movement between a measurement image set last time and each image included in the time-series image. When the amount of movement is less than a predetermined threshold value, the measurement image setting unit 210 may set the image used for calculating the amount of movement as a new measurement image.

After a candidate of a new measurement image is extracted, the measurement image setting unit 210 may confirm that there is no large halation region in the measurement image and no large blur has occurred in the measurement image. When there is a large halation region in the new measurement image or large blur has occurred in the new measurement image, the measurement image setting unit 210 may extract a new measurement image again.

After Step S44, the image display unit 231 displays the measurement image set in Step S44 on the display 15 (Step S45).

After Step S45, a user determines whether or not a position for which measurement is scheduled to be executed is included in the measurement image. A user inputs a determination result by operating the operation unit 12. The acceptance unit 245 accepts the determination result from the operation unit 12 (Step S46).

When the acceptance unit 245 accepts the determination result that represents that the position for which measurement is scheduled to be executed is included in the measurement image in Step S46, Step S6 is executed. When the determination result that represents that the position for which measurement is scheduled to be executed is not included in the measurement image is accepted in Step S46, the measurement image needs to be changed. For this reason, Step S43 is executed.

As described above, after Step S41, a user determines whether or not execution of measurement is possible. When execution of measurement is possible, a user may designate a reference point, a measurement point, or the like by operating the operation unit 12. When a reference point, a measurement point, or the like is designated by a user in Step S42, the acceptance unit 245 may accept a determination result that represents that execution of measurement is possible. In this case, Step S12 is executed. Only when execution of measurement is impossible, a user may input a determination result by performing pressing of a button or the like.

The measurement assistance processing in Step S41 may not be executed. In other words, after Step S1 is executed, Step S42 may be executed without the measurement assistance processing being executed. In a case in which the measurement assistance processing is not executed, a user confirms the state of a measurement image and determines whether or not it is possible to execute measurement for a position for which measurement is scheduled to be executed.

In a case in which the measurement assistance processing is executed, Steps S52 to S55 are not essential. Only one or two of Step S53, Step S54, and Step S55 may be executed. In a case in which Step S53 is not executed, Step S52 is not essential.

Step S43 is not essential. A method of changing a measurement image may be set in advance. When the manual change is set in advance, Step S2 may be executed without Step S43 being executed. When the automatic change is set in advance, Step S44 may be executed without Step S43 being executed.

Step S45 and Step S46 are not essential. After Step S44, Step S6 may be executed without Step S45 and Step S46 being executed.

A measurement method according to each aspect of the present invention may include a second image display step. When the image determination unit 22 determines that an image is suitable for measurement in the determination step (Step S3, Step S6, Step S8, and Step S10), the 3D model display unit 240 (display control unit) displays a three-dimensional image (3D image) that represents a three-dimensional shape of a subject on the display 15 in the second image display step (Step S51) before the measurement step (Step S25) is executed.

A measurement method according to each aspect of the present invention may include a cursor display step. Before the measurement step is executed, the cursor display unit 243 (display control unit) displays a first cursor on a measurement image and displays a second cursor at a position on the three-dimensional image corresponding to the position of the first cursor on the measurement image in the cursor display step (Step S54).

A measurement method according to each aspect of the present invention may include a reliability calculation step and a reliability display step. Before the measurement step is executed, the reliability calculation unit 241 calculates the reliability of each position on the three-dimensional shape on the basis of the image group used for generating the three-dimensional shape in the reliability calculation step (Step S52). The reliability represents the accuracy of the size of a subject measured in a case in which it is assumed that the measurement step is executed. Before the measurement step is executed, the reliability display unit 242 (display control unit) displays the reliability on the three-dimensional image in the reliability display step (Step S53).

A measurement method according to each aspect of the present invention may include a region display step. Before the measurement step is executed, the region display unit 244 (display control unit) displays, on the measurement image, a region including a position on the measurement image that does not correspond to a position on the three-dimensional shape in the region display step (Step S55).

A measurement method according to each aspect of the present invention may include an information input step. After the determination step is executed, the acceptance unit 245 accepts change method information through the operation unit 12 (input device) in the information input step (Step S43). The change method information represents that the measurement image is changed either manually or automatically. When the change method information represents that the measurement image is changed automatically, the image setting step (Step S44) is executed again. When the change method information represents that the measurement image is changed manually, the selection step (Step S2) is executed again.

After the selection step is executed again, the image setting step is executed again. After the image setting step is executed again, at least part of a sequence including the extraction step (Step S7), the generation step (Step S9), the determination step, the first image display step (Step S11), the point setting step (Step S24), and the measurement step (Step S25) is executed again.

Each image included in a plurality of two-dimensional images is associated with a time point at which the image is generated. The measurement image setting unit 210 may extract one image that is generated in a predetermined period that is based on the time point at which the measurement image is generated and is different from the measurement image from the plurality of two-dimensional images in the image setting step (Step S44) executed again. The measurement image setting unit 210 may set the extracted image as a new measurement image in the image setting step executed again.

The measurement image setting unit 210 may calculate the amount of movement between the measurement image and each image included in the plurality of two-dimensional images in the image setting step (Step S44) executed again. The measurement image setting unit 210 may extract one image for which the amount of movement is less than a predetermined threshold value and that is different from the measurement image from the plurality of two-dimensional images in the image setting step executed again. The measurement image setting unit 210 may set the extracted image as a new measurement image in the image setting step executed again.

After the determination step is executed, the image setting step (Step S44) may be executed again when a second instruction for changing the measurement image is accepted through the operation unit 12 (input device).

In the second embodiment, in a case in which an image is determined to be suitable for measurement, the measurement assistance processing is executed before the size measurement processing is executed. When the measurement assistance processing is executed, a 3D image is displayed. For this reason, a user can confirm a region on a measurement image for which a three-dimensional shape has not been restored. Even when it is impossible to execute measurement for a position desired by a user, the measurement device 1 can start processing for changing a measurement image at an early stage. Compared to a case in which a user actually designates a measurement point on a measurement image and notices that measurement is impossible, useless time can be reduced.

Since the reliability of a measurement result is displayed in the measurement assistance processing, a user can avoid execution of measurement for a position having the low reliability. A user can determine whether or not a measurement image is changed on the basis of the reliability of the position for which measurement is scheduled to be executed.

Since a cursor is displayed on each of a measurement image and a 3D image, a user can understand a position on the measurement image for which a three-dimensional shape has not been restored and a position on the measurement image having the low reliability. Since a region for which measurement is impossible is displayed on a measurement image, a user can avoid execution of measurement for a position for which measurement is impossible.

Manual change and automatic change are prepared as a method of changing a measurement image. When the automatic change is executed, it is possible to reduce time for a user to change a measurement image. When the automatic change is executed a predetermined number of times and a measurement image desired by a user has not been set, a user can select the manual change instead of the automatic change. A user can select the automatic change or the manual change each time one measurement image is changed. For this reason, operability by a user is improved.

Modified Example of Second Embodiment

Figure 15:
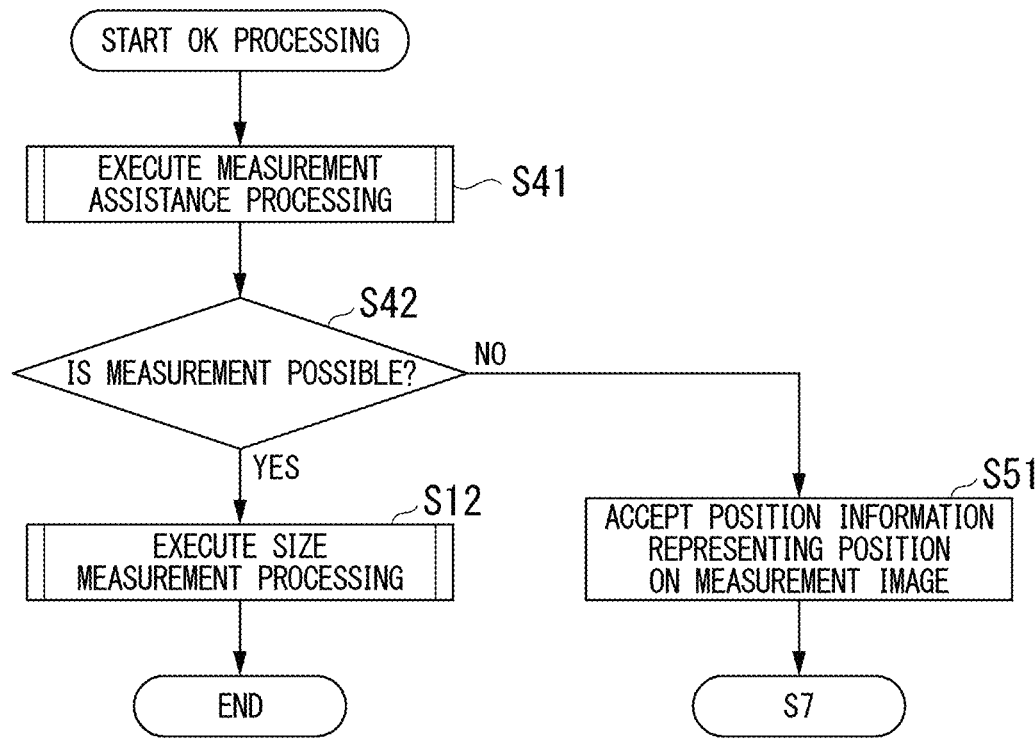
FIG. 15 is a flow chart showing a procedure of processing executed by a measurement device according to a modified example of the second embodiment of the present invention.

In a modified example of a second embodiment of the present invention, the processing shown in FIG. 9 is changed to processing shown in FIG. 15. A procedure of the OK processing in Step S31 will be described with reference to FIG. 15. FIG. 15 shows a procedure of processing executed by the CPU 13*a*. The same processing as the processing shown in FIG. 9 will not be described.

When a determination result that represents that execution of measurement is impossible is accepted in Step S42, a measurement image needs to be changed. A user inputs position information that represents a position on the measurement image desired for execution of measurement by operating the operation unit 12. The acceptance unit 245 accepts the position information from the operation unit 12 (Step S51). A user may designate at least two positions on the measurement image. After Step S51, Step S7 is executed.

The image extraction unit 211 extracts at least one image including a position represented by the position information within a visual field from the time-series image in Step S7. For this reason, the possibility that a measurement result with the high accuracy at the position designated by a user is obtained increases. When Step S7 is executed again, at least one image not including a position represented by the position information within a visual field may be extracted in addition to at least one image including the position represented by the position information within a visual field.

When Step S7 is executed again and an image is determined to be not suitable for measurement in Step S8 or Step S10, Step S2 is executed again. When Step S7 is executed again and an image is determined to be suitable for measurement in Step S8 or Step S10, Step S42 is executed again. When a user determines that execution of measurement is possible in Step S42, the size measurement processing is executed. At this time, a measurement point may be automatically set at a position designated by a user in Step S51.

A measurement method according to each aspect of the present invention may include a position input step. When the image determination unit 22 determines that an image is suitable for measurement in the determination step (Step S3, Step S6, Step S8, and Step S10), the acceptance unit 245 accepts position information that represents a position on a measurement image through the operation unit 12 (input device) in the position input step (Step S51) before the measurement step (Step S25) is executed. After the position input step is executed, the extraction step (Step S7) is executed again. The image extraction unit 211 extracts at least one third image including the position represented by the position information from a plurality of two-dimensional images in the extraction step. After the extraction step is executed again, at least part of a sequence including the generation step (Step S9), the determination step, the first image display step (Step S11), the point setting step (Step S24), and the measurement step (Step S25) is executed again.

There is a case in which an image is determined to be suitable for measurement but it is impossible to execute measurement for a position desired by a user. When a user inputs position information that represents a position for which the user desires execution of measurement, at least one image including the position within a visual field is extracted and a 3D model is generated again. For this reason, the possibility that measurement is executed at the position for which a user desires execution of measurement and a measurement result is obtained increases. In addition, since an image in a good state at a position designated by a user is extracted and the image is used for generating a 3D model, the possibility that a measurement result with the high accuracy is obtained increases.

In the OK processing shown in FIG. 9, there is a possibility that a measurement image in a bad state at a position for which a user desires execution of measurement is repetitively set. In the OK processing shown in FIG. 15, a user can designate a position for which the user desires execution of measurement. For this reason, the possibility that measurement is executed at the position for which a user desires execution of measurement and a measurement result is obtained increases. In addition, since an image in a good state at a position designated by a user is extracted and the image is used for generating a 3D model, the possibility that a measurement result with the high accuracy is obtained increases.

Third Embodiment

Figure 16:
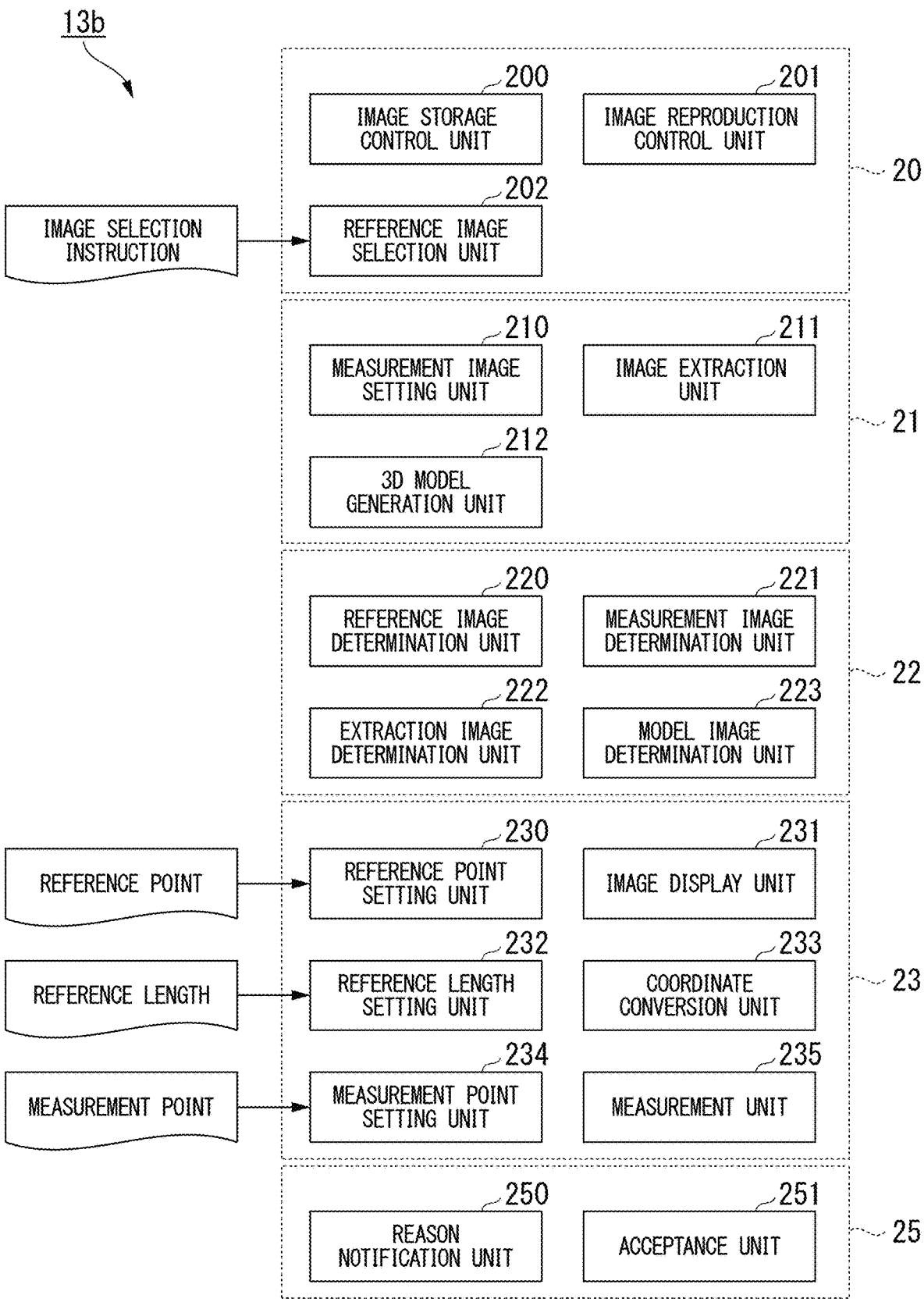
FIG. 16 is a block diagram showing a functional configuration of a CPU included in a measurement device according to a third embodiment of the present invention.

In the third embodiment of the present invention, the CPU 13 shown in FIG. 2 is changed to a CPU 13b shown in FIG. 16. FIG. 16 shows a functional configuration of the CPU 13b. The same configuration as the configuration shown in FIG. 2 will not be described. At least one of blocks shown in FIG. 16 may be constituted by a circuit other than the CPU 13b.

Each unit shown in FIG. 16 may be constituted by at least one of a processor and a logic circuit. Each unit shown in FIG. 16 may include one or a plurality of processors. Each unit shown in FIG. 16 may include one or a plurality of logic circuits.

An image reproduction unit 20, a 3D model acquisition unit 21, an image determination unit 22, a measurement processing unit 23, and an NG processing unit 25 constitute the functions of the CPU 13b. The NG processing unit 25 includes a reason notification unit 250 and an acceptance unit 251.

When an image is determined to be not suitable for measurement, the reason notification unit 250 notifies a user of a reason why the image is determined to be not suitable for measurement on the basis of a result of the determination processing. The acceptance unit 251 accepts information input by a user through the operation unit 12.

Figure 17:
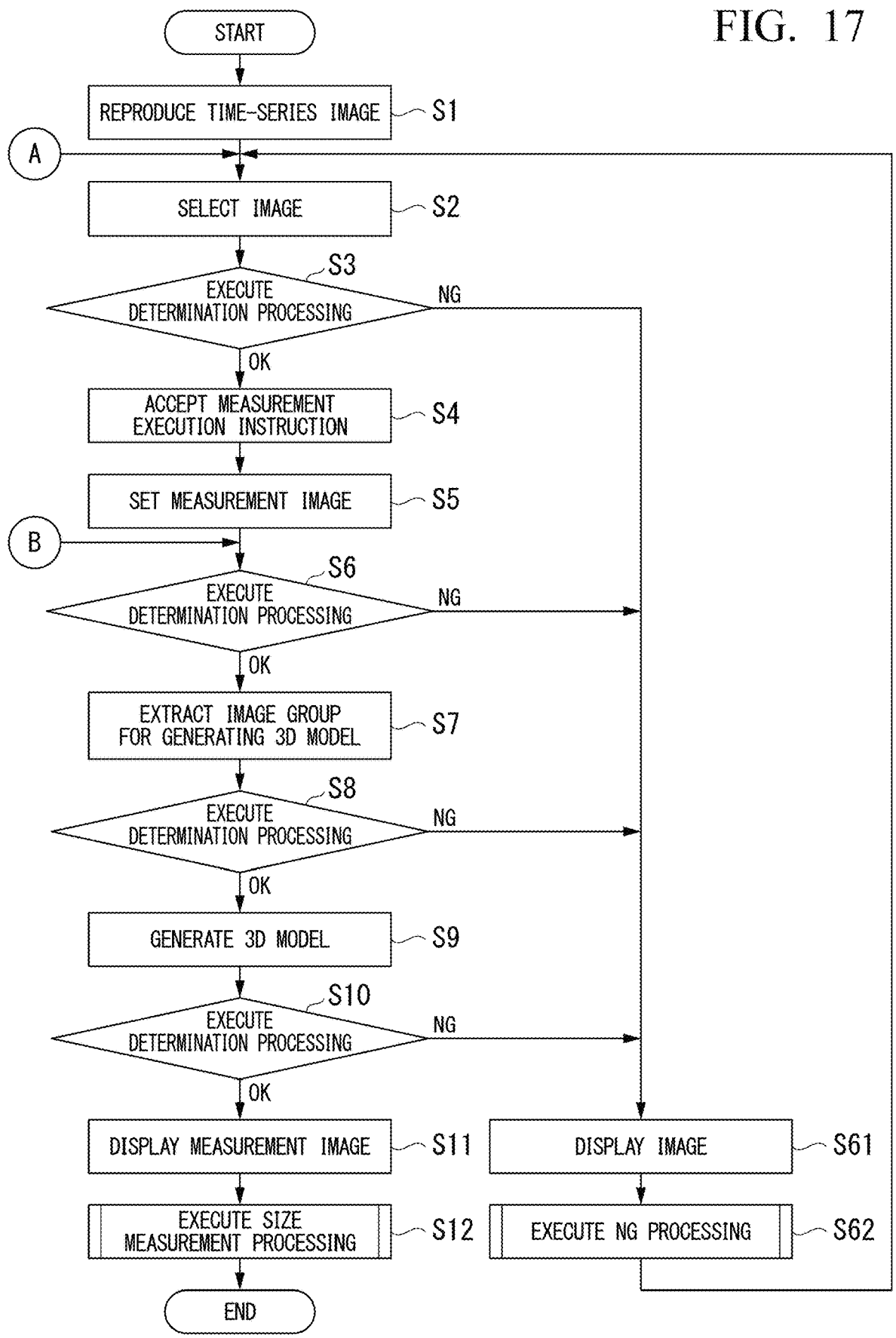
FIG. 17 is a flow chart showing a procedure of processing executed by the measurement device according to the third embodiment of the present invention.

The processing shown in FIG. 5 is changed to processing shown in FIG. 17. A procedure of processing executed for measurement will be described with reference to FIG. 17. FIG. 17 shows a procedure of processing executed by the CPU 13b. The same processing as the processing shown in FIG. 5 will not be described.

When the image determination unit 22 determines that an image is not suitable for measurement in Step S3, the image display unit 231 displays the reference image selected in Step S2 on the display 15 (Step S61). When the image determination unit 22 determines that an image is not suitable for measurement in any one of Step S6, Step S8, and Step S10, the image display unit 231 displays the measurement image set in Step S5 on the display 15 (Step S61).

After Step S61, NG processing is executed (Step S62). After Step S62, Step S2 is executed.

Figure 18:
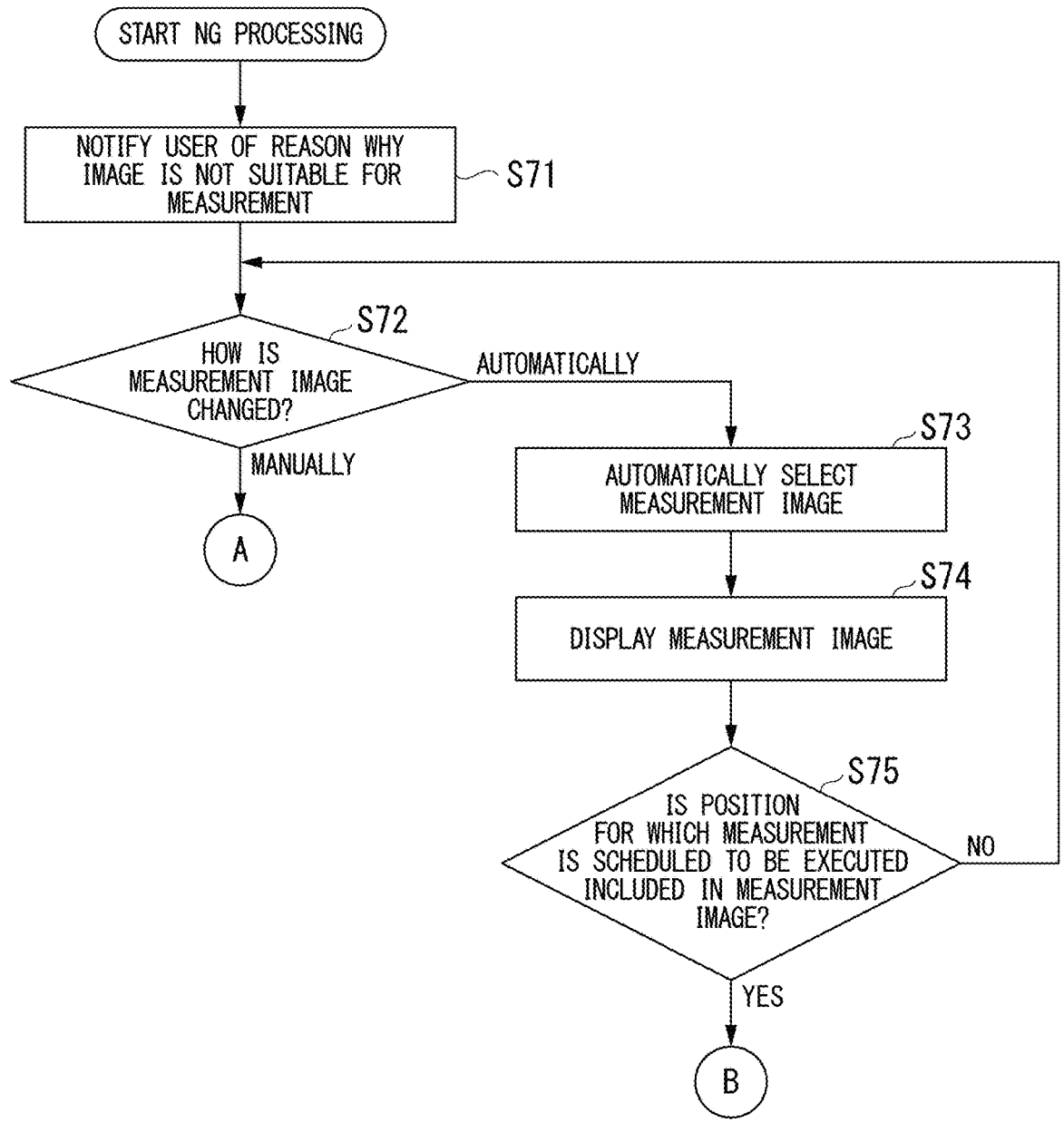
FIG. 18 is a flow chart showing a procedure of processing executed by the measurement device according to the third embodiment of the present invention.

A procedure of the NG processing in Step S62 will be described with reference to FIG. 18. FIG. 18 shows a procedure of processing executed by the CPU 13b.

The reason notification unit 250 generates a message that represents a reason why an image is determined to be not suitable for measurement. The reason notification unit 250 displays the message on the display 15 (Step S71).

In a case in which an image is determined to be not suitable for measurement, the reason is different for each execution timing of the determination processing. A determination criterion for determining that an image is suitable for measurement is different for each execution timing of the determination processing.

In a case in which an image is determined to be not suitable for measurement in Step S3, it is assumed that the brightness of the reference image, the texture of the reference image, or the state of blur of the reference image is not suitable for measurement. The reason notification unit 250 displays a message that represents a reason corresponding to the determination criterion that has not been satisfied in Step S3 on the display 15. For example, when the brightness of the reference image has not satisfied the determination criterion, the reason notification unit 250 displays a message that represents a reason regarding the brightness of the reference image on the display 15.

In a case in which an image is determined to be not suitable for measurement in Step S6, it is assumed that at least one of the brightness of the measurement image, the texture of the measurement image, and the state of blur of the measurement image is not suitable for measurement. The reason notification unit 250 displays a message that represents a reason corresponding to the determination criterion that has not been satisfied in Step S6 on the display 15. For example, when the texture of the measurement image has not satisfied the determination criterion, the reason notification unit 250 displays a message that represents a reason regarding the texture of the measurement image on the display 15.

In a case in which an image is determined to be not suitable for measurement in Step S8, it is assumed that the number of feature points or the distribution of coordinates of feature points is not suitable for measurement. The reason notification unit 250 displays a message that represents a reason corresponding to the determination criterion that has not been satisfied in Step S8 on the display 15. For example, when the number of feature points has not satisfied the determination criterion, the reason notification unit 250 displays a message that represents a reason regarding the number of feature points on the display 15.

In a case in which an image is determined to be not suitable for measurement in Step S10, it is assumed that an estimation result of the position and the posture of a camera or a result of the matching processing is not suitable for measurement. The estimation result of the position and the posture of the camera is determined on the basis of a reprojection error. The result of the matching processing is determined on the basis of a correlation value. The reason notification unit 250 displays a message that represents a reason corresponding to the determination criterion that has not been satisfied in Step S10 on the display 15. For example, when the estimation result of the position and the posture of the camera has not satisfied the determination criterion, the reason notification unit 250 displays a message that represents a reason regarding the estimation result of the position and the posture of the camera on the display 15.

The reason notification unit 250 may output a message that represents a reason why an image is determined to be not suitable for measurement by audio. As long as a user can confirm a reason why an image is determined to be not suitable for measurement, a method of notifying the user of the reason is not limited to the above-described method.

Figure 19:
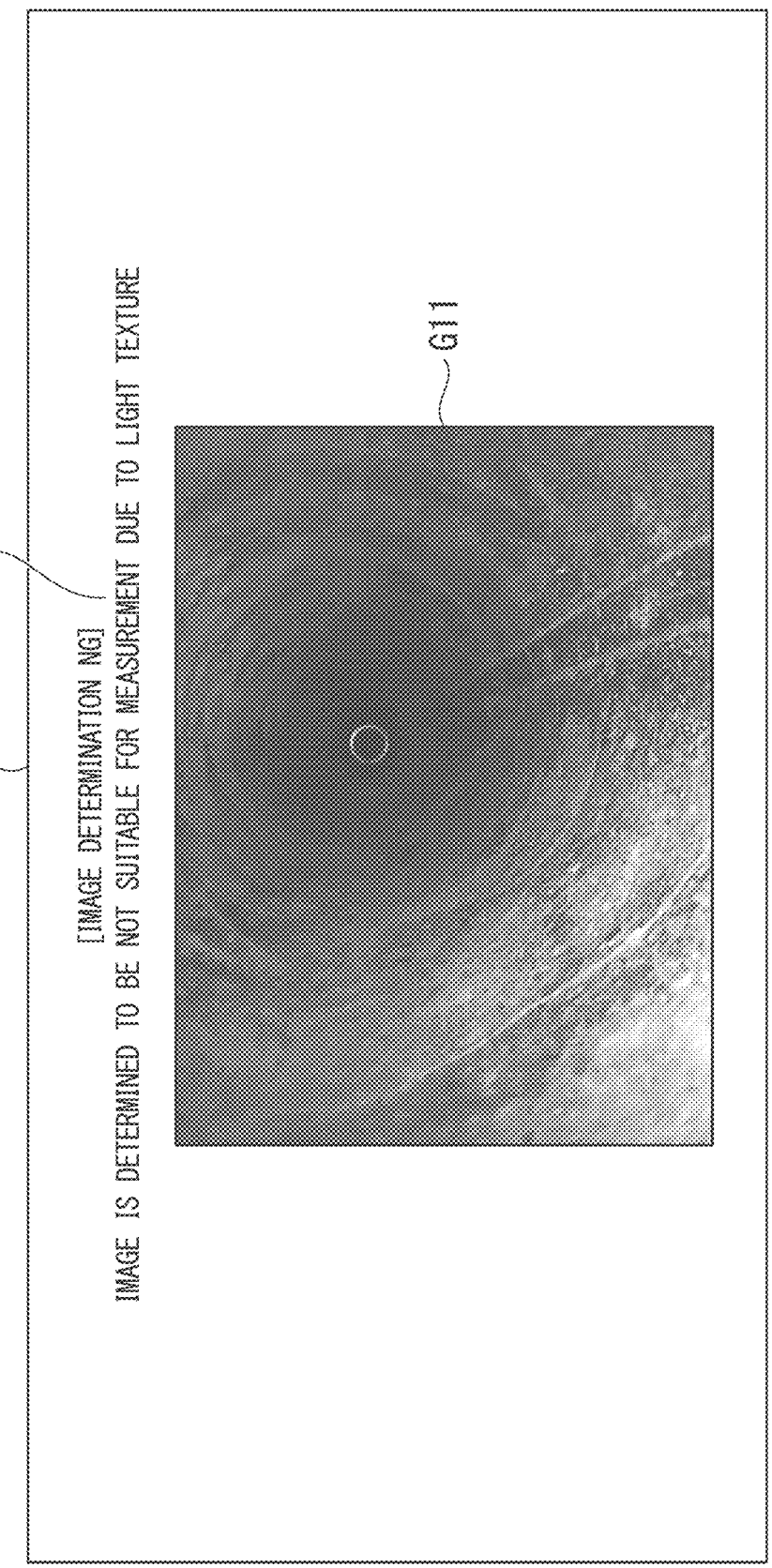
FIG. 19 is a diagram showing an example of an image displayed on a display included in the measurement device according to the third embodiment of the present invention.

FIG. 19 shows an example of an image displayed on the display 15 in Step S71. An image G11 is displayed on the screen of the display 15. The image G11 is a reference image or a measurement image. A message MIO is displayed on the screen of the display 15.

Since an image is not suitable for measurement, the measurement image needs to be changed. After the reason why the image is not suitable for measurement is notified, a user inputs information that represents a method of changing the measurement image by operating the operation unit 12. The method of changing the measurement image is either manual change or automatic change. The acceptance unit 251 accepts the information from the operation unit 12 (Step S72). When an image is determined to be not suitable for measurement in Step S3, Step S2 is executed without Step S72 being executed.

When the acceptance unit 251 accepts the information that represents the manual change in Step S72, Step S2 is executed. In this case, a user confirms each image included in the time-series image by using the image reproduction function. A user inputs an image selection instruction again. After the reference image is manually changed and an image is determined to be suitable for measurement in Step S3, a measurement image is set in Step S5 on the basis of the changed reference image.

When the acceptance unit 251 accepts the information that represents the automatic change in Step S72, the measurement image setting unit 210 extracts one image different from a measurement image set at the time of executing Step S5 last time from the time-series image. The measurement image setting unit 210 sets the extracted image as a measurement image (Step S73).

After Step S73, the image display unit 231 displays the measurement image set in Step S73 on the display 15 (Step S74).

After Step S74, a user determines whether or not a position for which measurement is scheduled to be executed is included in the measurement image. A user inputs a determination result by operating the operation unit 12. The acceptance unit 251 accepts the determination result from the operation unit 12 (Step S75).

When the acceptance unit 251 accepts the determination result that represents that the position for which measurement is scheduled to be executed is included in the measurement image in Step S75, Step S6 is executed. When the determination result that represents that the position for which measurement is scheduled to be executed is not included in the measurement image is accepted in Step S75, the measurement image needs to be changed. For this reason, Step S72 is executed. Steps S72 to S75 are similar to Steps S43 to S46 shown in FIG. 9.

Step S72 is not essential. A method of changing a measurement image may be set in advance. When the manual change is set in advance, Step S2 may be executed without Step S72 being executed. When the automatic change is set in advance, Step S73 may be executed without Step S72 being executed.

Step S74 and Step S75 are not essential. After Step S73, Step S6 may be executed without Step S74 and Step S75 being executed.

In Step S71, a message that only represents that an image is not suitable for measurement may be displayed on the display 15. In this case, a reason why an image is determined to be not suitable for measurement is not notified to a user. After the message is displayed, Step S2 or Step S5 may be executed again. There is a case in which an image is determined to be not suitable for measurement in Step S2 and Step S61 and Step S71 are executed. In this case, Step S2 is executed again.

A measurement method according to each aspect of the present invention may include an output step. When the image determination unit 22 determines that an image is not suitable for measurement in the determination step (Step S3, Step S6, Step S8, and Step S10), the reason notification unit 250 (output unit) outputs information that represents a reason why the image is determined to be not suitable for measurement on the basis of a result of the determination step in the output step (Step S71).

When the image determination unit 22 determines that an image is not suitable for measurement in the determination step, the reason notification unit 250 may output information that represents that the image is not suitable for measurement. After the information is output, the selection step (Step S2) or the image setting step (Step S5) may be executed again.

In the third embodiment, a reason why the image is determined to be not suitable for measurement is notified to a user. In a case in which a measurement image is manually changed, a user can select an image with reference to this reason. Compared to a case in which a user selects an image without understanding the above-described reason, the possibility that an image is determined to be suitable for measurement increases.

A user can select a change method with reference to the above-described reason in Step S72. For example, there is a case in which an image is determined to be not suitable for measurement due to the light texture of the image. In such a case, a user selects the manual change and selects an image having many patterns. In this way, the possibility that an image is determined to be suitable for measurement increases. In a case in which a user selects the automatic change, there is a possibility that a measurement image automatically set is determined to be not suitable for measurement for the same reason as that of the last time. Since a user can select a change method in consideration of the reason of determination, operability by a user is improved.

Fourth Embodiment

A fourth embodiment of the present invention will be described. In the fourth embodiment, two devices cooperate with each other. A first device accepts an instruction from a user, executes processing, and notifies the user of a result of the processing. The first device executes processing related to display of an image, setting of a designation point, and the like. A second device executes processing related to generation of a 3D model and the like. For example, portability of the first device is excellent, but a calculation resource of the first device is small. Portability of the second device is not excellent, but a calculation resource of the second device is abundant. In the fourth embodiment, advantages of the two devices are utilized. There is a situation in which measurement using an image is required in a scene that makes difficult to carry a large device or the like. In such a situation, the fourth embodiment is effective.

Figure 20:
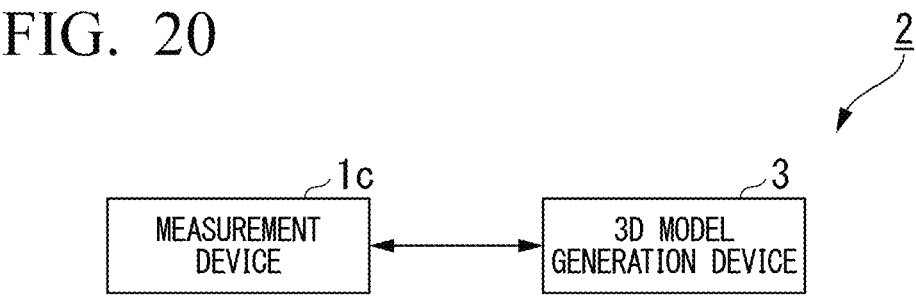
FIG. 20 is a block diagram showing a configuration of a measurement system according to a fourth embodiment of the present invention.

FIG. 20 shows a configuration of a measurement system 2 according to the fourth embodiment. The measurement system 2 shown in FIG. 20 includes a measurement device 1c and a 3D model generation device 3.

Figure 21:
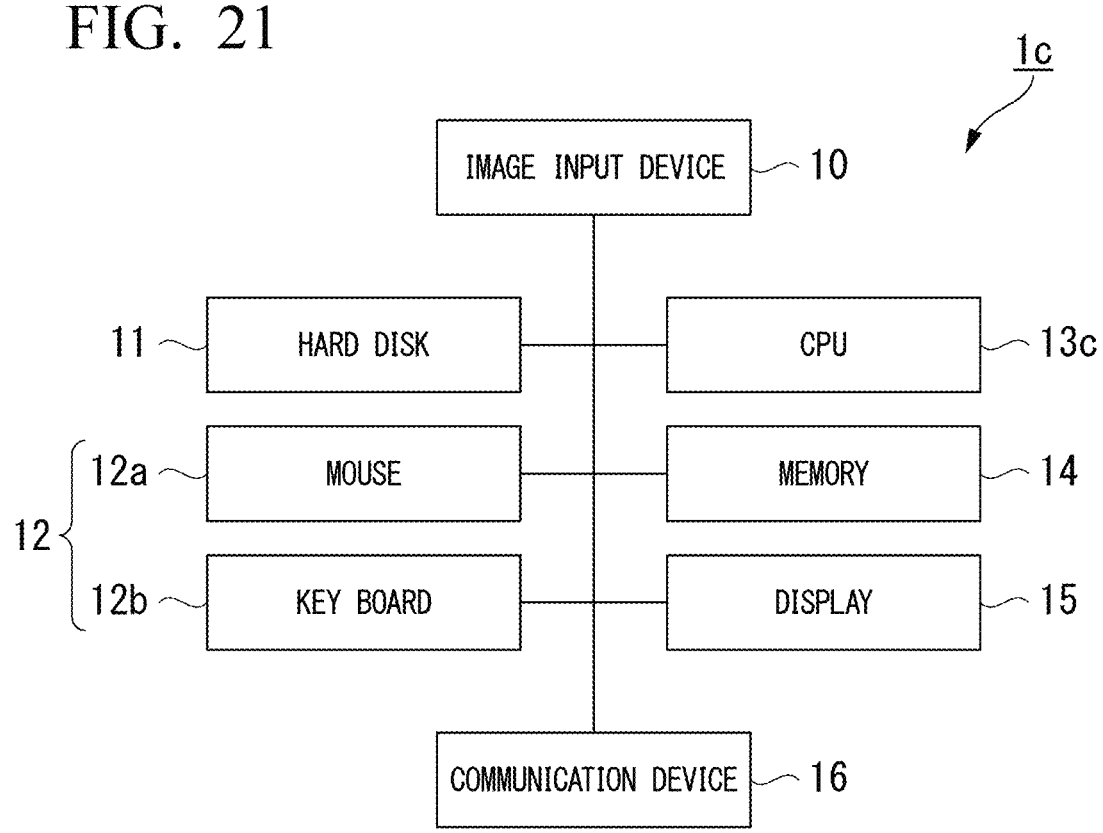
FIG. 21 is a block diagram showing a hardware configuration of a measurement device according to the fourth embodiment of the present invention.

FIG. 21 shows a hardware configuration of the measurement device 1c. The same configuration as that shown in FIG. 1 will not be described. The measurement device 1c shown in FIG. 21 includes an image input device 10, a hard disk 11, an operation unit 12, a CPU 13c, a memory 14, a display 15, and a communication device 16.

The communication device 16 performs communication with the 3D model generation device 3. For example, the communication device 16 is connected to the 3D model generation device 3 through a cable or by radio. Communication between the communication device 16 and the 3D model generation device 3 may be performed via a local area network (LAN) or the Internet.

Figure 22:
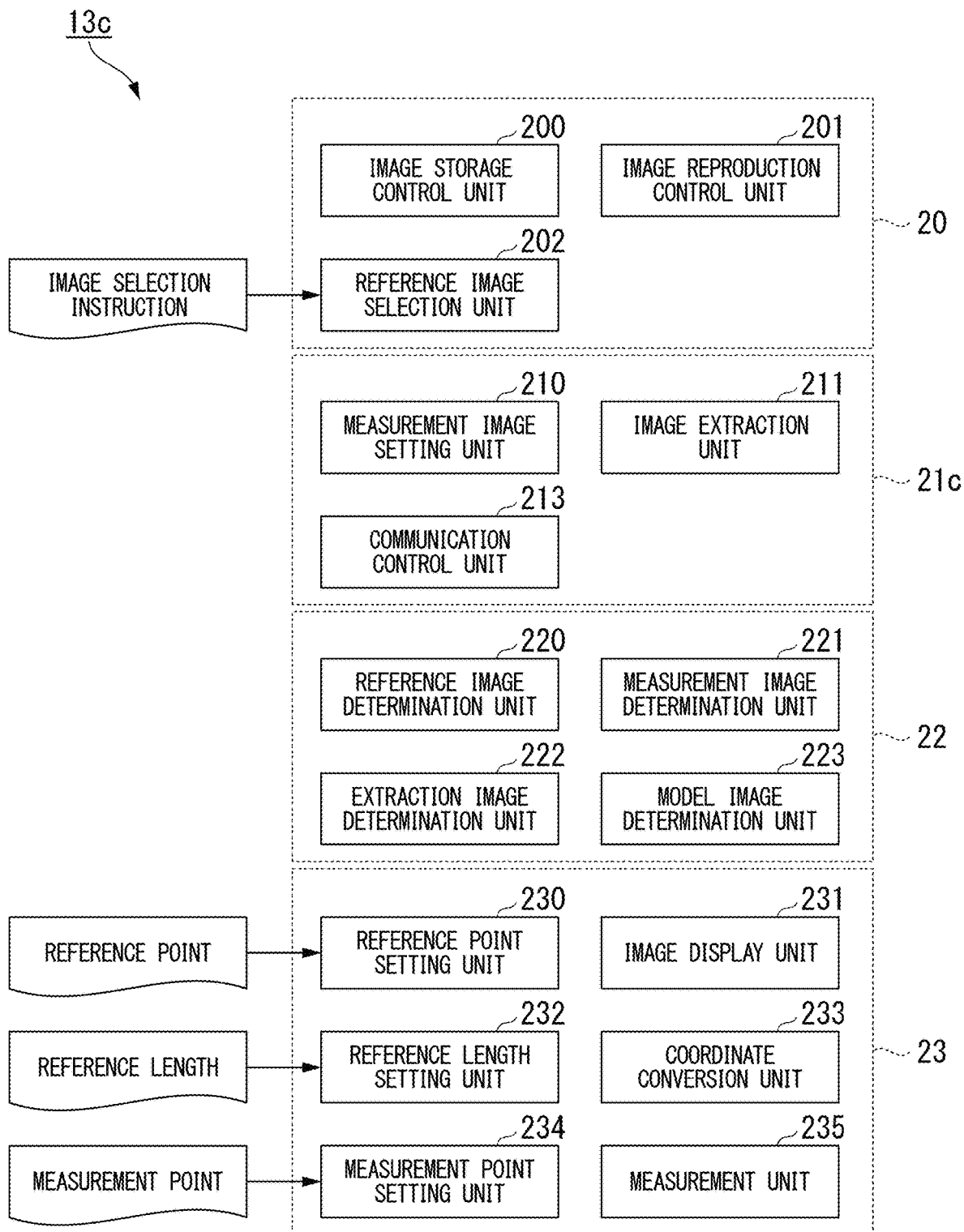
FIG. 22 is a block diagram showing a functional configuration of a CPU included in the measurement device according to the fourth embodiment of the present invention.

FIG. 22 shows a functional configuration of the CPU 13c. The same configuration as the configuration shown in FIG. 2 will not be described. At least one of blocks shown in FIG. 22 may be constituted by a circuit other than the CPU 13c.

Each unit shown in FIG. 22 may be constituted by at least one of a processor and a logic circuit. Each unit shown in FIG. 22 may include one or a plurality of processors. Each unit shown in FIG. 22 may include one or a plurality of logic circuits.

The 3D model acquisition unit 21 shown in FIG. 2 is changed to a 3D model acquisition unit 21c. The 3D model acquisition unit 21c includes a measurement image setting unit 210, an image extraction unit 211, and a communication control unit 213. The communication control unit 213 performs communication with the 3D model generation device 3 by controlling the communication device 16. The communication control unit 213 transmits at least two images for generating a 3D model to the 3D model generation device 3. The communication control unit 213 receives a 3D model from the 3D model generation device 3.

Figure 23:
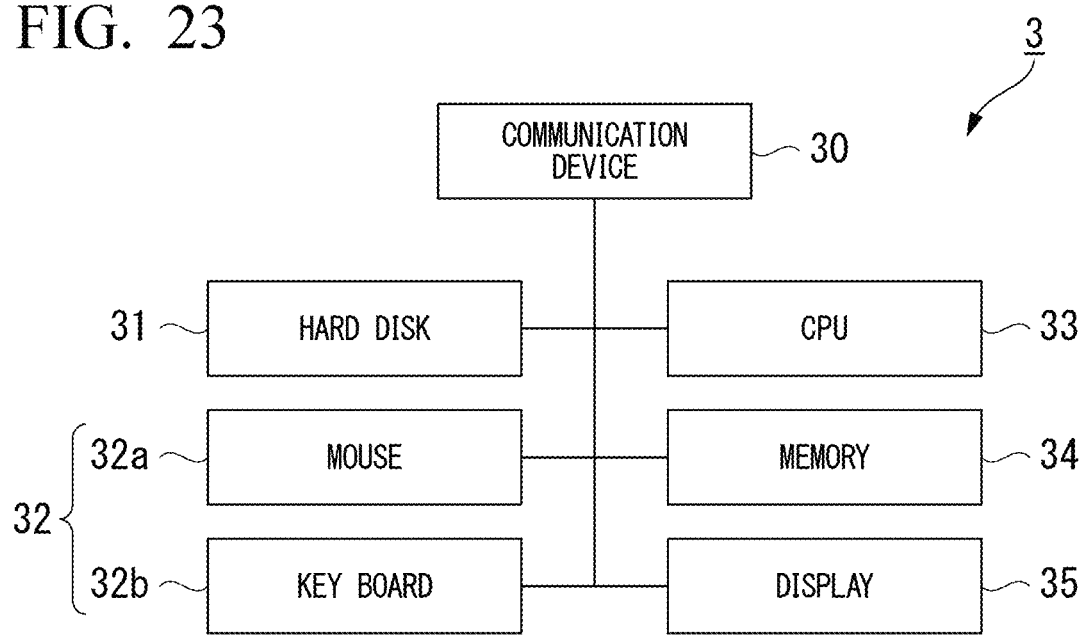
FIG. 23 is a block diagram showing a hardware configuration of a 3D model generation device according to the fourth embodiment of the present invention.

FIG. 23 shows a hardware configuration of the 3D model generation device 3. The 3D model generation device 3 shown in FIG. 23 includes a communication device 30, a hard disk 31, an operation unit 32, a CPU 33, a memory 34, and a display 35.

The communication device 30 performs communication with the measurement device 1c. The hard disk 31 stores at least two images received by the communication device 30. The 3D model generation device 3 may include an SSD instead of the hard disk.

The operation unit 32 is a user interface (input interface). The operation unit 32 includes a mouse 32a and a key board 32b.

The CPU 33 executes processing for generation (reconfiguration) of a three-dimensional shape of a subject. The functions of the CPU 33 will be described later with reference to FIG. 24.

The memory 34 is a volatile or nonvolatile memory. The memory 34 stores at least two images received by the communication device 16 or an image processed by the CPU 33. The display 35 is a monitor such as a liquid crystal display.

Figure 24:
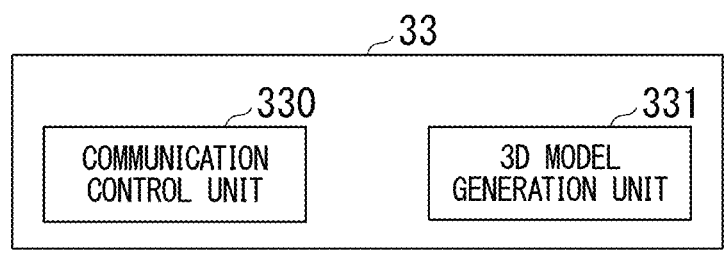
FIG. 24 is a block diagram showing a functional configuration of a CPU included in the 3D model generation device according to the fourth embodiment of the present invention.

FIG. 24 shows a functional configuration of the CPU 33. At least one of blocks shown in FIG. 24 may be constituted by a circuit other than the CPU 33.

Each unit shown in FIG. 24 may be constituted by at least one of a processor and a logic circuit. Each unit shown in FIG. 24 may include one or a plurality of processors. Each unit shown in FIG. 24 may include one or a plurality of logic circuits.

A communication control unit 330 and a 3D model generation unit 331 constitute the functions of the CPU 33. The communication control unit 330 performs communication with the measurement device 1c by controlling the communication device 30. The communication control unit 330 receives at least two images for generating a 3D model from the measurement device 1c. The communication control unit 330 transmits a 3D model to the measurement device 1c. The 3D model generation unit 331 has a function similar to that of the 3D model generation unit 212 shown in FIG. 2.

Figure 25:
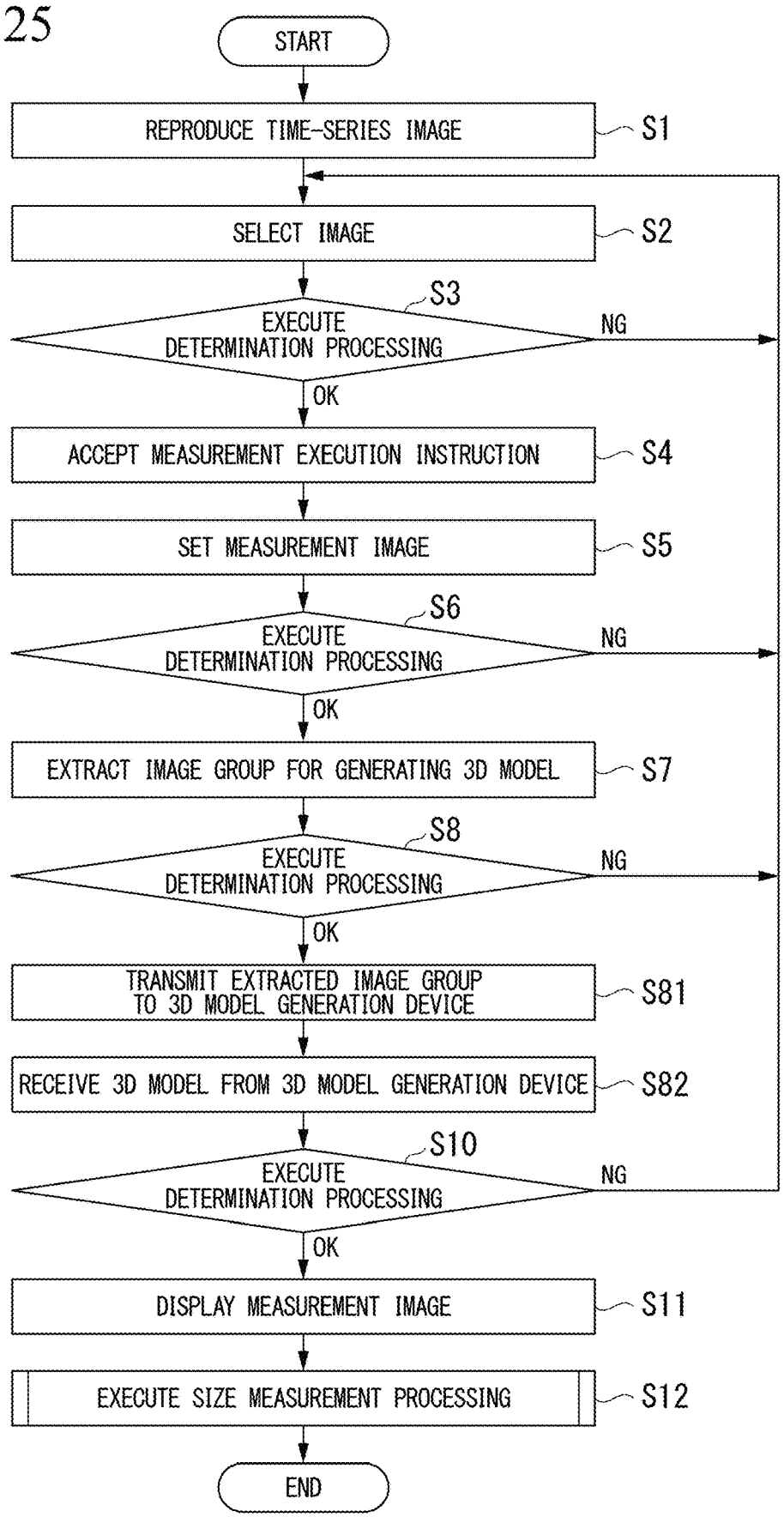
FIG. 25 is a flow chart showing a procedure of processing executed by the measurement device according to the fourth embodiment of the present invention.

A procedure of processing executed for generation of a 3D model and measurement will be described with reference to FIG. 25 and FIG. 26. FIG. 25 shows a procedure of processing executed by the CPU 13c of the measurement device 1c. FIG. 26 shows a procedure of processing executed by the CPU 33 of the 3D model generation device 3. The same processing as the processing shown in FIG. 5 will not be described.

When the extraction image determination unit 222 determines that an image is suitable for measurement in Step S8, the communication control unit 213 of the measurement device 1c transmits the measurement image set in Step S5 and at least one image extracted in Step S7 to the 3D model generation device 3 (Step S81). After Step S81, the communication control unit 213 of the measurement device 1c receives a 3D model from the 3D model generation device 3. In addition, the communication control unit 213 receives a result of the matching processing executed for generating a 3D model and the like from the 3D model generation device 3 (Step S82). The received 3D model is stored on the hard disk 11 or the memory 14. After Step S82, Step S10 is executed.

The communication control unit 330 of the 3D model generation device 3 receives at least two images from the measurement device 1c (Step S91). Received information is stored on the hard disk 31 or the memory 34.

After Step S91, the 3D model generation unit 331 estimates the position and the posture of a camera. The 3D model generation unit 331 generates a 3D model of a subject on the basis of the estimated position and posture (Step S92). Step S92 is similar to Step S9 shown in FIG. 5.

After Step S92, the communication control unit 330 transmits the 3D model generated in Step S92 to the measurement device 1c. In addition, the communication control unit 330 transmits a result of the matching processing and the like to the measurement device 1c (Step S93). When Step S93 is executed, the processing shown in FIG. 26 is completed.

In the above-described example, a plurality of pieces of processing are distributed in two devices. There are no limitations to the number of devices and there are no limitations to the processing executed by each device. For example, a plurality of 3D model generation devices 3 may execute time-consuming processing.

In the fourth embodiment, a plurality of devices execute processing in cooperation with each other. At least one of the plurality of devices has a feature that portability is excellent but a calculation resource is small. At least one of the plurality of devices has a feature that portability is not excellent but a calculation resource is abundant. The measurement system 2 can execute measurement by taking advantage of the plurality of devices.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A measurement method comprising:
a selection step in which a processor selects one first image included in a plurality of two-dimensional images of a subject when a first instruction for selecting the first image is accepted through an input device;
an image setting step in which the processor sets one of one second image and the first image as a measurement image, the second image being extracted from the plurality of two-dimensional images on the basis of the first image;
an extraction step in which the processor extracts at least one third image different from the measurement image from the plurality of two-dimensional images after the image setting step is executed, a viewpoint of a camera when each image of an image group is generated and a viewpoint of the camera when another image of the image group is generated are different from each other, the image group consisting of the measurement image and the third image;
an estimation step in which the processor estimates a position and a posture of the camera after the extraction step is executed, the position and the posture being a position and a posture, respectively, when each image of the image group is generated;
a generation step in which the processor generates a three-dimensional shape of the subject, after the estimation step is executed, on the basis of the position and the posture;
a determination step in which the processor determines whether or not an object image is suitable for measurement, the object image being at least one of the first image, the measurement image, and the third image;
a first image display step in which the processor displays the measurement image on a display;
a region display step in which the processor displays a region onto the measurement image, the region including a position on the measurement image that does not correspond to any position on the three-dimensional shape;
a point setting step in which the processor sets at least two measurement points on the measurement image when a second instruction for setting the at least two measurement points on the measurement image is accepted through the input device after the measurement image and the region are displayed; and
a measurement step in which the processor measures a size of the subject on the basis of the at least two measurement points and the three-dimensional shape only when the processor determines that the object image is suitable for measurement in the determination step,
wherein the determination step is executed at least once between an execution timing of the selection step and an execution timing of the measurement step.

2. The measurement method according to claim 1,
wherein the determination step is executed at least once between an execution timing of the extraction step and the execution timing of the measurement step.

3. The measurement method according to claim 2, further comprising a second display step in which, before the measurement step is executed, the processor displays a three-dimensional image representing the three-dimensional shape on the display in a case in which the processor determines that the object image is suitable for measurement in the determination step.

4. The measurement method according to claim 3, further comprising a cursor display step in which the processor displays a first cursor on the measurement image and displays a second cursor at a position on the three-dimensional image corresponding to a position of the first cursor on the measurement image before the measurement step is executed.

5. The measurement method according to claim 3, further comprising:
a reliability calculation step in which the processor calculates reliability of each position on the three-dimensional shape on the basis of the image group before the measurement step is executed, the reliability representing accuracy of the size measured in a case in which it is assumed that the measurement step is executed; and
a reliability display step in which the processor displays the reliability on the three-dimensional image before the measurement step is executed.

6. The measurement method according to claim 2, further comprising an output step in which the processor outputs information that represents a reason why the object image is determined to be not suitable for measurement on the basis of a result of the determination step when the processor determines that the object image is not suitable for measurement in the determination step.

7. The measurement method according to claim 2, further comprising an output step in which the processor outputs information that represents that the object image is not suitable for measurement when the processor determines that the object image is not suitable for measurement in the determination step,
wherein, after the information is output, the selection step or the image setting step is executed again.

8. The measurement method according to claim 2, further comprising an information input step in which the processor accepts change method information through the input device after the determination step is executed, the change method information representing that the measurement image is changed either manually or automatically,
wherein the image setting step is executed again when the change method information represents that the measurement image is changed automatically, and
the selection step is executed again when the change method information represents that the measurement image is changed manually.

9. The measurement method according to claim 8,
wherein each image included in the plurality of two-dimensional images is associated with a time point at which the image is generated, and
in the image setting step executed again, the processor:
extracts one image from the plurality of two-dimensional images;
wherein the extracted images are different from the measurement image and generated in a predetermined period that is based on a time point at which the measurement image is generated, and
sets the extracted image as a new measurement image.

10. The measurement method according to claim 8,
wherein, in the image setting step executed again, the processor:
calculates an amount of movement between the measurement image and each image included in the plurality of two-dimensional images;
extracts one image from the plurality of two-dimensional images;
wherein the amount of the extracted image is less than a predetermined threshold value and the extracted image is different from the measurement image, and sets the extracted image as a new measurement image.

11. The measurement method according to claim 2, wherein, after the determination step is executed, the image setting step is executed again when a second instruction for changing the measurement image is accepted through the input device, each image included in the plurality of two-dimensional images is associated with a time point at which the image is generated, and in the image setting step executed again, the processor:
extracts one image from the plurality of two-dimensional images;
wherein the extracted images are different from the measurement image and generated in a predetermined period that is based on a time point at which the measurement image is generated, and
sets the extracted image as a new measurement image.

12. The measurement method according to claim 2, wherein, after the determination step is executed, the image setting step is executed again when a second instruction for changing the measurement image is accepted through the input device, and in the image setting step executed again, the processor:
calculates an amount of movement between the measurement image and each image included in the plurality of two-dimensional images;
extracts one image from the plurality of two-dimensional images;
wherein the amount of the extracted image is less than a predetermined threshold value and the extracted image is different from the measurement image, and
sets the extracted image as a new measurement image.

13. The measurement method according to claim 2, further comprising a position input step in which, before the measurement step is executed, the processor accepts position information that represents a position on the measurement image through the input device when the processor determines that the object image is suitable for measurement in the determination step,
wherein, after the position input step is executed, the extraction step is executed again, and
the processor extracts the at least one third image including the position represented by the position information from the plurality of two-dimensional images in the extraction step.

14. The measurement method according to claim 2, wherein the processor traces feature points of each image included in the plurality of two-dimensional images between the images in the extraction step,
the determination step is executed between an execution timing of the extraction step and an execution timing of the generation step, and
the processor executes the determination step on the basis of a result that the processor traces the feature points.

15. The measurement method according to claim 2, wherein the determination step is executed between an execution timing of the generation step and an execution timing of the measurement step, and
the processor executes the determination step on the basis of a result that the processor generates the three-dimensional shape.

16. A measurement device comprising a processor, wherein the processor is configured to select one first image included in a plurality of two-dimensional images of a subject when a first instruction for selecting the first image is accepted through an input device;
the processor is configured to set one of one second image and the first image as a measurement image, the second image being extracted from the plurality of two-dimensional images on the basis of the first image;
the processor is configured to extract at least one third image different from the measurement image from the plurality of two-dimensional images after the measurement image is set, a viewpoint of a camera when each image of an image group is generated and a viewpoint of the camera when another image of the image group is generated are different from each other, the image group consisting of the measurement image and the third image;
the processor is configured to estimate a position and a posture of the camera after the at least one third image is extracted, the position and the posture being a position and a posture, respectively, when each image of the image group is generated;
the processor is configured to generate a three-dimensional shape of the subject, after the position and the posture are estimated, on the basis of the position and the posture;
the processor is configured to determine whether or not an object image is suitable for measurement, the object image being at least one of the first image, the measurement image, and the third image;
the processor is configured to display the measurement image on a display;
the processor is configured to display a region onto the measurement image, the region including a position on the measurement image that does not correspond to any position on the three-dimensional shape;
the processor is configured to set at least two measurement points on the measurement image when a second instruction for setting the at least two measurement points on the measurement image is accepted through the input device after the measurement image and the region are displayed; and
the processor is configured to measure a size of the subject on the basis of the at least two measurement points and the three-dimensional shape only when the processor determines that the object image is suitable for measurement,
wherein the processor is configured to determine whether or not the object image is suitable for measurement at least once between a timing at which the first image is selected and a timing at which the size is measured.

17. A non-transitory computer-readable recording medium saving a program for causing a computer to execute:
a selection step of selecting one first image included in a plurality of two-dimensional images of a subject when a first instruction for selecting the first image is accepted through an input device;
an image setting step of setting one of one second image and the first image as a measurement image, the second image being extracted from the plurality of two-dimensional images on the basis of the first image;
an extraction step of extracting at least one third image different from the measurement image from the plurality of two-dimensional images after the image setting step is executed, a viewpoint of a camera when each image of an image group is generated and a viewpoint of the camera when another image of the image group is generated are different from each other, the image group consisting of the measurement image and the third image;

an estimation step of estimating a position and a posture of the camera after the extraction step is executed, the position and the posture being a position and a posture, respectively, when each image of the image group is generated;

a generation step of generating a three-dimensional shape of the subject, after the estimation step is executed, on the basis of the position and the posture;

a determination step of determining whether or not an object image is suitable for measurement, the object image being at least one of the first image, the measurement image, and the third image;

a first image display step of displaying the measurement image on a display;

a region display step of displaying a region onto the measurement image, the region including a position on the measurement image that does not correspond to any position on the three-dimensional shape;

a point setting step of setting at least two measurement points on the measurement image when a second instruction for setting the at least two measurement points on the measurement image is accepted through the input device after the measurement image and the region are displayed; and a measurement step of measuring a size of the subject on the basis of the at least two measurement points and the three-dimensional shape only when the computer determines that the object image is suitable for measurement in the determination step, wherein the determination step is executed at least once between an execution timing of the selection step and an execution timing of the measurement step.

* * * * *